(12) United States Patent
Kudo et al.

(10) Patent No.: US 9,664,272 B2
(45) Date of Patent: May 30, 2017

(54) VIBRATION ISOLATING STRUCTURE FOR POWER UNIT

(71) Applicant: HONDA MOTOR CO., LTD., Tokyo (JP)

(72) Inventors: Takashi Kudo, Wako (JP); Toshimasa Mitsubori, Wako (JP); Hiromi Sumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 457 days.

(21) Appl. No.: 14/223,210

(22) Filed: Mar. 24, 2014

(65) Prior Publication Data

US 2014/0290408 A1   Oct. 2, 2014

(30) Foreign Application Priority Data

Mar. 28, 2013  (JP) ................................ 2013-069930

(51) Int. Cl.
*F16H 55/14*   (2006.01)
*F16H 57/00*   (2012.01)
*F16H 3/08*    (2006.01)

(52) U.S. Cl.
CPC .............. *F16H 55/14* (2013.01); *F16H 3/08* (2013.01); *F16H 57/0006* (2013.01); *Y10T 74/19633* (2015.01)

(58) Field of Classification Search
CPC .......... F16H 57/006; F16H 2057/0012; F16H 57/0006; F16H 55/14; F16F 15/123; B60K 17/08
USPC ........................................................... 74/411
See application file for complete search history.

(56) References Cited

U.S. PATENT DOCUMENTS

| 8,166,840 | B2 * | 5/2012 | Nedachi ................ F16D 48/062 |
| | | | 192/48.1 |
| 2008/0251301 | A1 * | 10/2008 | Mochizuki ............... B60K 5/00 |
| | | | 180/54.1 |
| 2011/0072924 | A1 * | 3/2011 | Sotani ..................... F16H 55/14 |
| | | | 74/411 |
| 2012/0298466 | A1 * | 11/2012 | Nedachi .................. F16D 48/06 |
| | | | 192/84.6 |

FOREIGN PATENT DOCUMENTS

| JP | 57-12141 | * | 1/1982 |
| JP | 2003-193854 A | | 7/2003 |
| JP | 2007-177866 | * | 7/2007 |

* cited by examiner

*Primary Examiner* — William C Joyce
(74) *Attorney, Agent, or Firm* — Squire Patton Boggs (US) LLP

(57) ABSTRACT

A vibration isolating structure for a power unit. The power unit includes an internal combustion engine equipped with transmissions. The vibration isolation structure includes torque dampers disposed between transmission gears of the transmission and a power transmission shaft supporting the transmission gears.

18 Claims, 12 Drawing Sheets

VIBRATION ISOLATING STRUCTURE FOR POWER UNIT

BACKGROUND

Field

Embodiments of the present invention relate to a vibration isolating structure for a power unit including an internal combustion engine equipped integrally with a transmission.

Description of the Related Art

A power unit has a plurality of power transmission mechanisms interposed in the process of transmitting rotational power of a crankshaft of an internal combustion engine to an output shaft through a clutch device and a transmission.

In general, a clutch device includes, on a primary driven gear, a torque damper for damping torque variations attendant on a shift of the clutch.

In addition, as described in Japanese Patent Laid-Open No. 2003-193854 (Patent Document 1), there is an example in which a plurality of torque dampers for damping the torque variations attendant on a shift of a transmission are disposed in order to suppress, as securely as possible, vibrations of the power unit.

Patent Document 1 discloses a configuration wherein a cam-type damper is disposed between a clutch output shaft and the input side of a gear transmission of a constantly meshed type, and a torque damper is disposed between a counter shaft (the output of the transmission) and an output shaft of the power unit.

In a power unit having a transmission, torque variations are generated with a timing of a change of the current shift position at the time of a gear shift, or due to reaction forces of driving generated between the vehicle and the road surface. To damp such large torque variations, in Patent Document 1, torque dampers are disposed both on the input side of the transmission and on the output side of the transmission, in an attempt to suppress the vibrations of the power unit as securely as possible.

SUMMARY

However, where torque dampers are disposed respectively on the input side and the output side of the transmission, the power unit would be enlarged in size. In addition, if a large torque is generated in the transmission, the pairs of transmission gears at the gear speeds where drive power is not being transmitted would directly constitute an inertial mass. Therefore, even if a plurality of torque dampers is disposed, it is not necessarily easy to suppress vibrations arising from variations in torque.

Certain embodiments of the present invention have been made in consideration of the foregoing. Accordingly, it is an object of certain embodiments of the present invention to dispose a vibration isolating structure for a power unit that ensures torque variations attendant on a gear shift or on reaction forces of driving can themselves be suppressed to low levels, the power unit can be reduced in size, and vibrations of the power unit attendant on vibrations of transmission gears can be reduced.

In order to attain the above object, certain embodiments of the present invention reside in a vibration isolating structure for a power unit. The power unit includes an internal combustion engine equipped with a transmission. Torque dampers are disposed between a transmission gear of the transmission and a power transmission shaft supporting the transmission gear.

In other embodiments, mutually rotatable intermediate rotational members are interposed between the transmission gear and the power transmission shaft supporting the transmission gear. The intermediate rotational members are supported on the power transmission shaft. The torque dampers include a cam-type torque damper disposed between the power transmission shaft, and the intermediate rotational members. Damper springs are disposed between the intermediate rotational members and the transmission gear.

In other embodiments, the transmission gear is a transmission driven gear of a pair of a transmission driving gear and the transmission driven gear meshed with each other.

In other embodiments, the damper springs disposed between the transmission gear and the intermediate rotational members are arranged in plurality along a circumferential direction.

In other embodiments, the plurality of damper springs includes damper springs different in spring characteristics, the different damper springs being mixedly present.

In other embodiments, the damper springs are disposed at a spoke part of the transmission gear in the surroundings of the power transmission shaft, and are interposed between the transmission gear and the intermediate rotational members.

In other embodiments, a second transmission gear relevant to a speed different from a speed relevant to the transmission gear is disposed, with a second damper spring interposed between the second transmission gear and the intermediate rotational members.

In other embodiments, the power unit includes a clutch device between the internal combustion engine and the transmission, and a clutch damper is disposed on an input side of the clutch device.

In other embodiments, the transmission includes a main transmission on an upstream side with respect to power transmission, and a sub transmission on a downstream side with respect to the power transmission. A main transmission output shaft of the main transmission, and a sub transmission input shaft of the sub transmission are in spline fit to each other. The transmission gear disposed with the torque dampers is the transmission gear of the sub transmission.

According to certain embodiments, the torque dampers are disposed between the transmission gear of the transmission and the power transmission shaft supporting the transmission gear. Therefore, the gear on one side of the meshed pair of transmission gears is composed of separate bodies divided by the torque dampers. Accordingly, the inertial mass of the transmission as a whole is reduced. Consequently, torque variations attendant on reaction forces of driving or on a gear shift can themselves be suppressed to low levels, and vibrations of the power unit can be easily reduced.

In addition, the torque dampers are disposed between the transmission gear and the power transmission shaft, and need not be disposed respectively, for example, on the input side and the output side of the transmission. Consequently, the power unit can be reduced in size.

According to other embodiments, the mutually rotatable intermediate rotational members are interposed between the transmission gear and the power transmission shaft supporting the transmission gear, the intermediate rotational members being supported on the power transmission shaft. In addition, the torque dampers include the cam-type torque damper disposed between the power transmission shaft and the intermediate rotational members, and the damper springs disposed between the intermediate rotational members and the transmission gear. Therefore, by the double torque damper composed of the cam-type torque damper and the damper springs, the torque variations attendant on gear shifting can be further suppressed to a lower level, and the vibrations of the power unit can be more reduced. Further, the cam-type torque damper and the damper springs are mounted in position in compact form between the transmission gear and the power transmission shaft. Consequently, the power unit can be maintained to be small in size.

According to other embodiments, the transmission gear is the transmission driven gear of the pair of the transmission driving gear and the transmission driven gear meshed with each other. Thus, the damper springs are disposed between the transmission driven gear and the intermediate rotational members, whereas the cam-type torque damper is disposed between the intermediate rotational members and the power transmission shaft on the downstream side with respect to power transmission. This ensures that the cam-type torque damper and the damper springs on the upstream side cooperate with each other in exhibiting a vibration-isolating effect, against the excessive reverse torques coming from the drive wheels. Consequently, the damper springs can be made smaller in size.

According to other embodiments, the damper springs disposed between the transmission gear and the intermediate rotational members are arranged in plurality along the circumferential direction. Therefore, the damper springs are dispersely arranged along the circumferential direction. Accordingly, it is possible to reduce the size of each of the damper springs, to arrange the damper springs compactly along the circumferential direction, and to reduce the size of the vibration isolating structure, while maintaining required spring elastic forces.

According to other embodiments, the plurality of damper springs includes damper springs different in spring characteristics, the different damper springs being mixedly present. Therefore, torsional vibrations in a wide vibrational frequency range can be absorbed, and vibration isolation characteristics can be enhanced.

According to other embodiments, the damper springs are disposed at the spoke part of the transmission gear in the surroundings of the power transmission shaft, and are interposed between the transmission gear and the intermediate rotational members. Thus, the damper springs are arranged through utilization of the spaces near the spoke part between the tooth portion of the transmission gear and the power transmission shaft. This makes it possible to mount the vibration isolating structure in position in compact form, to reduce the size of the transmission, and to reduce the number of component parts.

According to other embodiments, the second transmission gear relevant to a speed different from the speed relevant to the transmission gear is disposed, with the second damper spring interposed between the second transmission gear and the intermediate rotational members. Therefore, the two transmission gears relevant to different gear speeds can be compactly disposed through common use of the intermediate rotational members and the cam-type torque damper. Consequently, appropriate vibration isolation characteristics can be easily set for each of gear speeds, while adopting a simple structure having a reduced number of component parts.

According to other embodiments, the power unit includes the clutch device between the internal combustion engine and the transmission. In addition, the clutch damper is disposed on the input side of the clutch device. Therefore, by the clutch damper, the influences of variations in torque of the crankshaft of the internal combustion engine can be prevented from being imposed on the transmission. In addition, torque variations attendant on a clutch shift can be absorbed. Consequently, vibrations of the power unit can be reduced.

According to other embodiments, the transmission includes the main transmission on the upstream side with respect to power transmission and the sub transmission on the downstream side with respect to the power transmission. In addition, the main transmission output shaft of the main transmission and the sub transmission input shaft of the sub transmission are in spline fit to each other and are rotated as one body. Further, the transmission gear disposed with the torque dampers is the transmission gear of the sub transmission. Thus, the clutch damper is arranged for the clutch device on the input side of the main transmission. The cam-type torque damper and the damper springs are arranged on the output side of the sub transmission. The main transmission output shaft and the sub transmission input shaft are in spline fit to each other and are rotated as one body. Therefore, variations in torque of the clutch and the main transmission on the upstream side of the spline fit part, and variations in torque of the sub transmission cancel each other owing to the spline fit between the main transmission output shaft and the sub transmission input shaft. As a result, an excellent vibration-isolation effect is produced.

DETAILED DESCRIPTION

Now, certain embodiments of the present invention will be described below, based on FIGS. 1 to 13.

A power unit P according to certain embodiments is mounted on a five-seater all-terrain vehicle 1 capable of four wheel drive.

Figure 1:
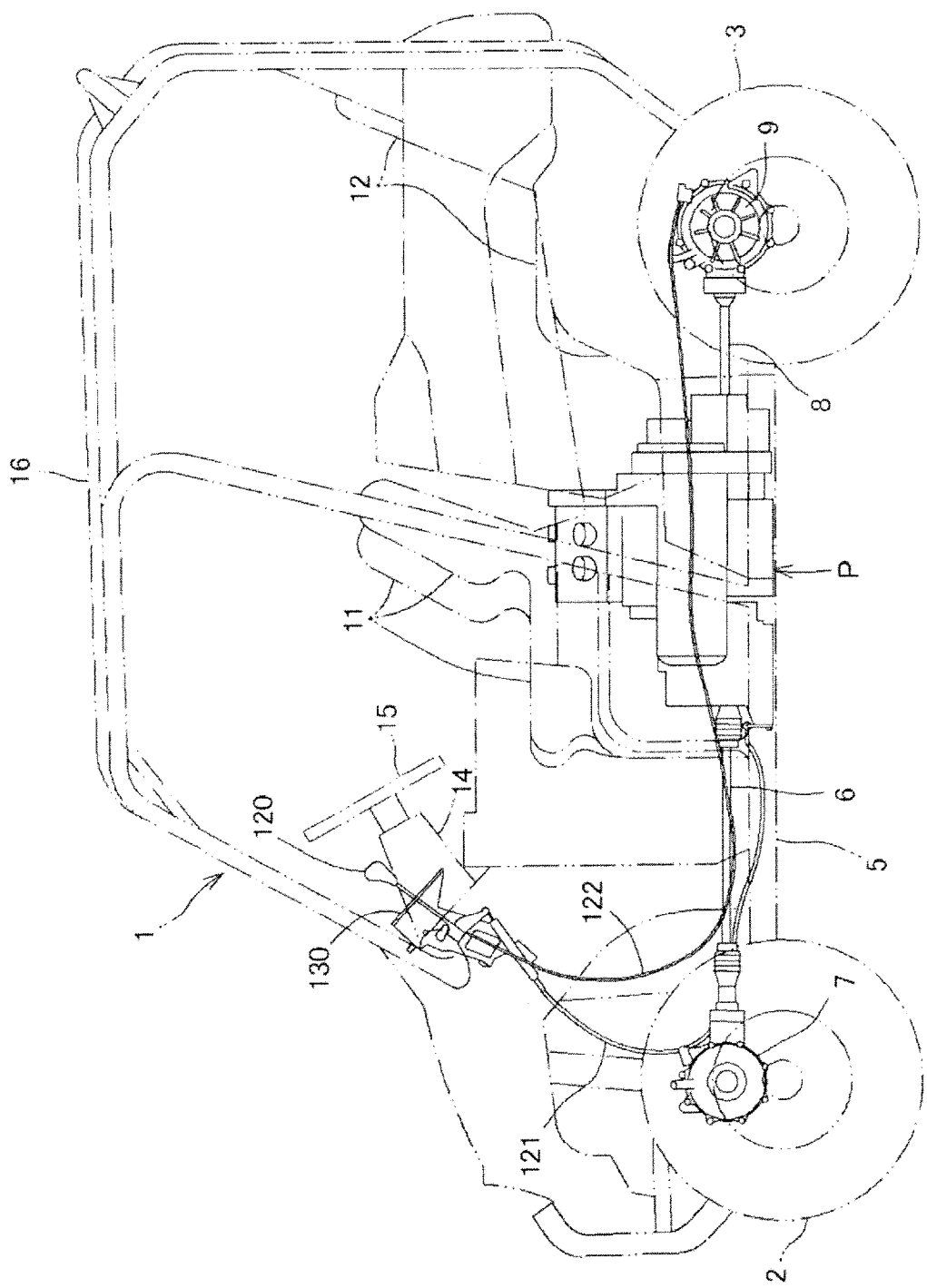
FIG. 1 is a side view of an all-terrain vehicle having mounted thereon a power unit according to certain embodiments of the present invention.

Referring to FIG. 1, the all-terrain vehicle 1 has a structure in which a pair of left and right front wheels 2, 2 and a pair of left and right rear wheels 3, 3, with low-pressure balloon tires mounted thereon, are suspended on a body frame 5 at front and rear positions.

At a longitudinal-vehicle-directionally central position of the body frame 5, the power unit P is mounted, with a crankshaft 21 of an internal combustion engine E oriented in the longitudinal vehicle direction. An output shaft (transmission driven shaft) 51 of the power unit P is protruding in the longitudinal direction. Rotating power of the output shaft 51 is transmitted from the front end of the output shaft 51 to the left and right front wheels 2, 2 through a front drive shaft 6 and a front differential gear unit 7, and is transmitted from the rear end of the output shaft 51 to the left and right rear wheels 3, 3 through a rear drive shaft 8 and a rear differential gear unit 9.

The front differential gear unit 7 and the rear differential gear unit 9 have a differential lock mechanism added thereto. A clutch mechanism engaged and disengaged to allow and interrupt transmission of power to the front wheels, thereby switching between four wheel drive and two wheel drive, is incorporated in the front differential gear unit 7.

On the upper side of the power unit P, three front seats 11 are arranged side by side in the left-right direction. At a rear portion of the body frame 5, two rear seats 12 are arranged side by side in the left-right direction.

The central one of the front seats 11 is a driver's seat, which protrudes forward beyond the left and right front seats 11.

Forwardly of this driver's seat, a steering wheel 15 is disposed in the state of protruding from a steering column 14.

A parking operation lever 120 is arranged at an operation panel 130 in the vicinity of the steering column 14.

The front seats 11 and the rear seats 12 are covered with a roof 16 on the upper side thereof.

In the power unit P mounted on the all-terrain vehicle 1, an in-line two-cylinder water-cooled four-stroke internal combustion engine E is combined with a main transmission Tm and a sub transmission Ts, which constitute a power transmission system 20.

The power unit P is mounted on the body frame 5 in a so-called longitudinal posture in which the crankshaft 21 of the internal combustion engine E is oriented in the longitudinal vehicle direction.

As shown in FIG. 1, a shift cable 121 and a parking cable 122 extend from the parking operation lever 120. The shift cable 121 is connected to the tip end of a shift operating lever 100 having a base end fitted to a shift spindle 101 projecting to the front side of the sub transmission Ts.

On the other hand, the parking cable 122 extends toward the rear side of the vehicle, and is connected to an operating part of a differential lock mechanism 160 added to the rear differential gear unit 9.

Figure 2:
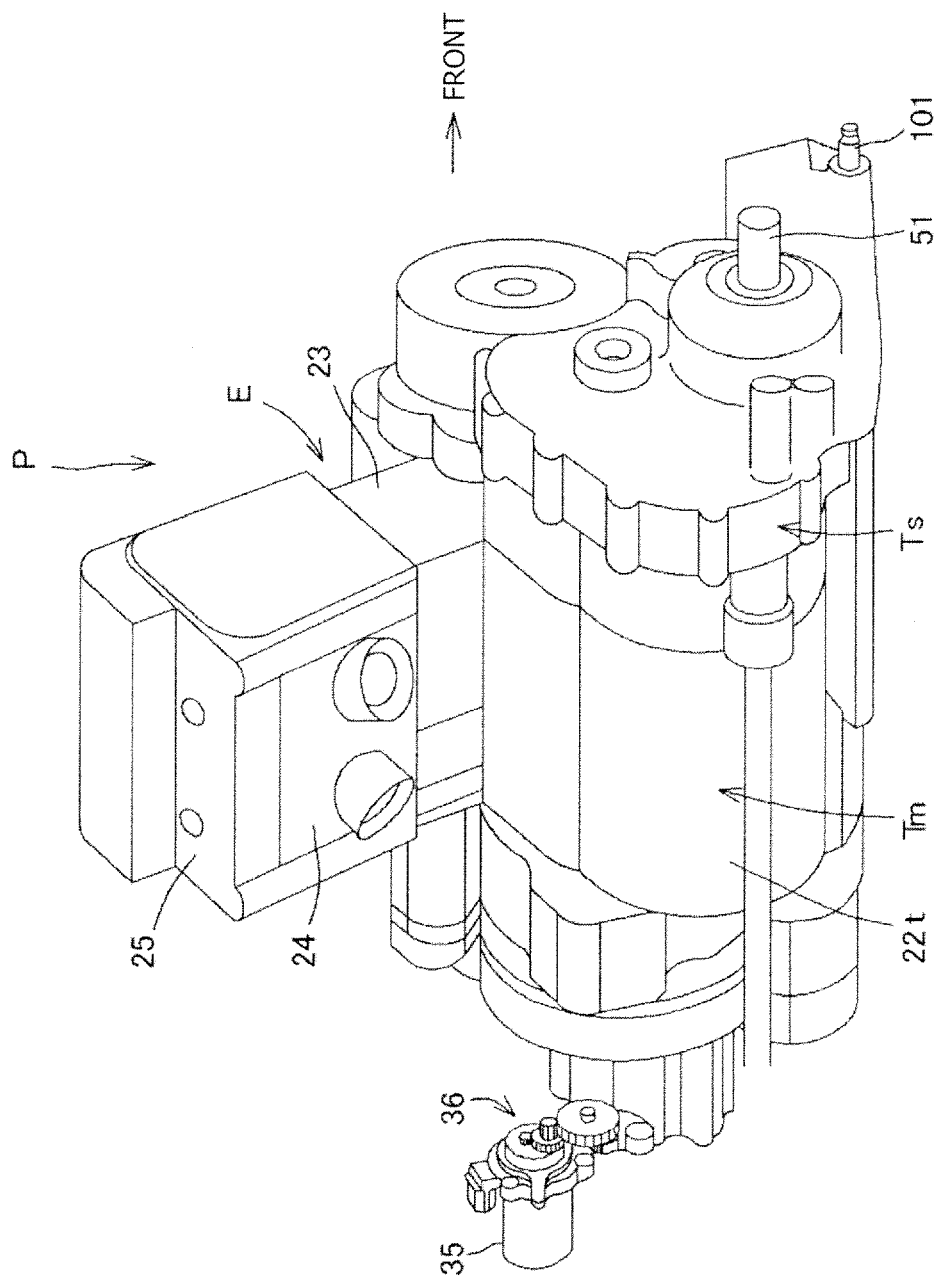
FIG. 2 is a general perspective view of a power unit in certain embodiments.
Figure 3:
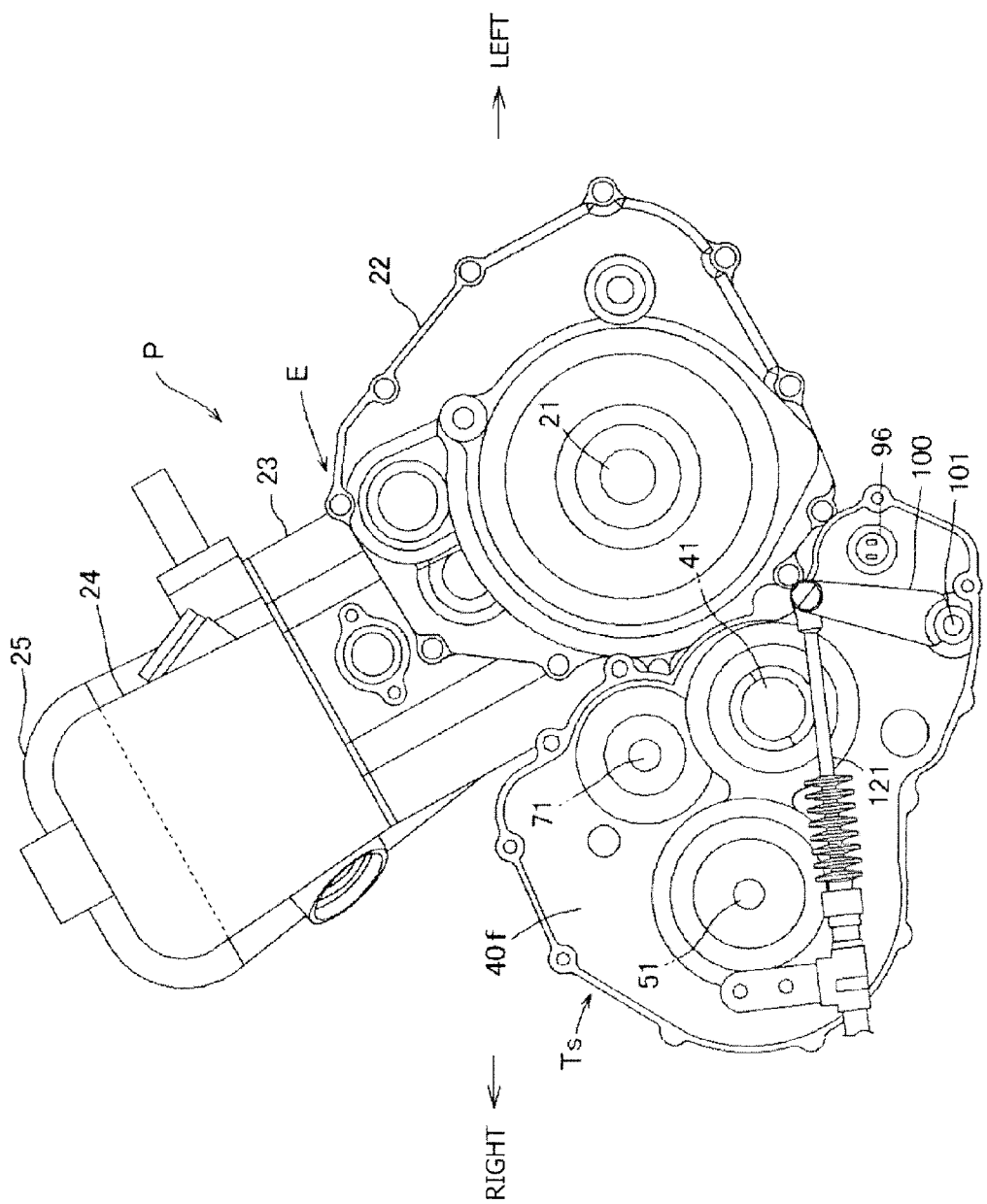
FIG. 3 is a front view of the power unit.

Referring to FIGS. 2 and 3, the power unit P has a cylinder block 23, a cylinder head 24, and a cylinder head cover 25 sequentially stacked and projecting obliquely toward a right upper side of a crankcase 22, on which the crankshaft 21 of the internal combustion engine E is rotatably supported.

The crankcase 22 is bulged rightward to constitute a main transmission case 22t for accommodating the main transmission Tm.

The main transmission Tm is located at the right side of the crankshaft 21 of the internal combustion engine E. The sub transmission Ts is projectingly disposed while substantially overlapping on the front side of the main transmission Tm.

Figure 5:
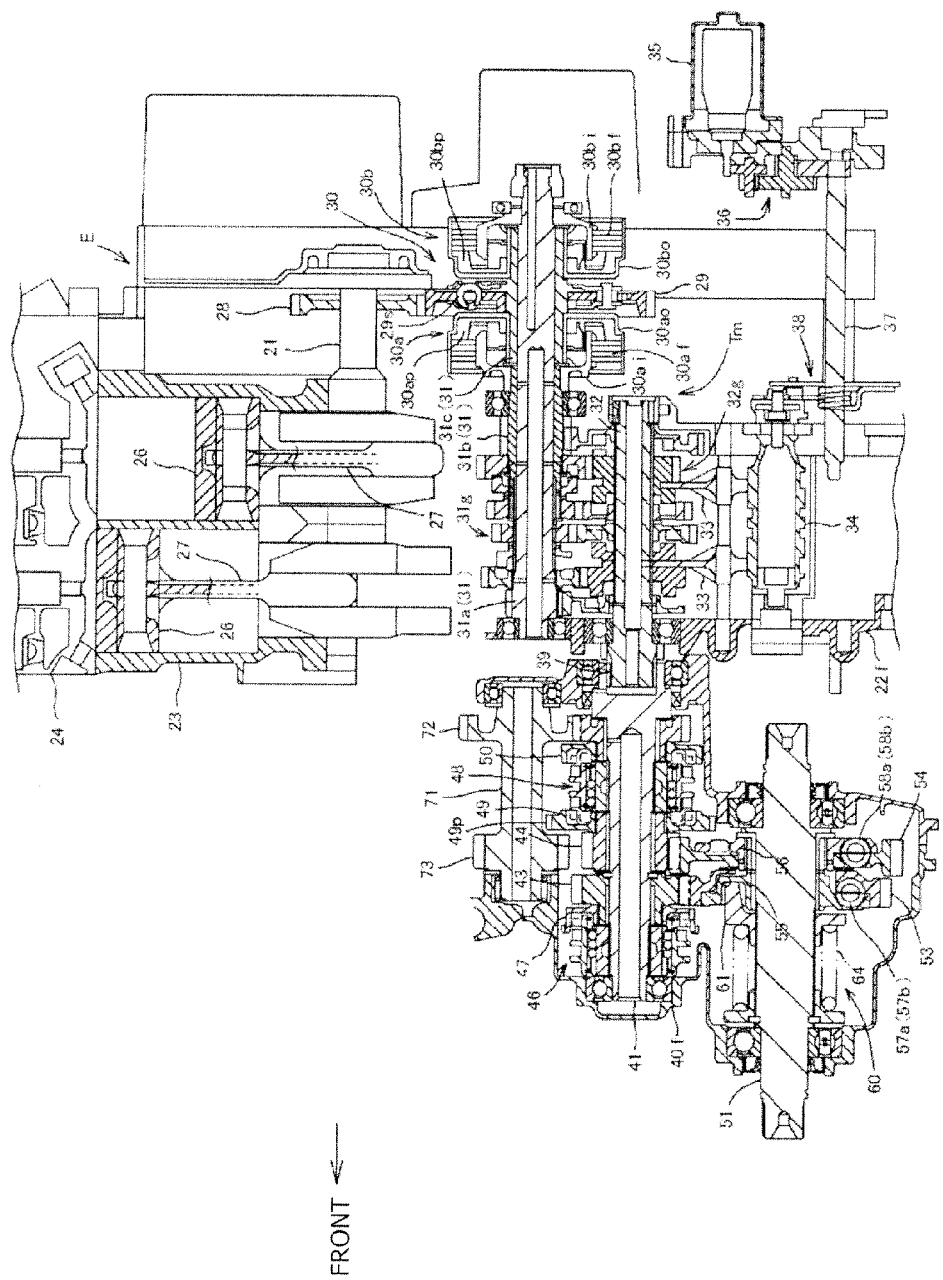
FIG. 5 is a sectional view of a power transmission device, showing a general view of a power transmission system of the power unit.

The whole part of the power transmission system 20 is shown in section in FIG. 5.

In the cylinder block 23 of the internal combustion engine E, two cylinders are formed in the state of being arranged in line (in series) in the longitudinal vehicle direction. A piston 26 slidably reciprocated in each of cylinder bores of the cylinders and the crankshaft 21 are interconnected by a connecting rod 27, whereby a reciprocating motion of the piston 26 is converted into rotation of the crankshaft 21, before being outputted.

A primary driving gear 28 is fitted onto a front end portion of the crankshaft 21, which is oriented in the longitudinal vehicle direction.

A main shaft 31 of the main transmission Tm located on the right side of the crankshaft 21 has a configuration wherein a main shaft outer tube 31b and a clutch part outer tube 31c, arranged juxtaposedly in a left-right relationship, are rotatably fitted over an outer circumference of a long main shaft inner tube 31a.

The main shaft 31 is disposed with six driving transmission gears 31g. A counter shaft 32 is disposed with six driven transmission gears 32g, which correspond to and are constantly meshed with the six driving transmission gears 31g.

The driving transmission gears 31g for odd-numbered speeds are disposed on the main shaft inner tube 31a, while the driving transmission gears 31g for even-numbered speeds are disposed on the main shaft outer tube 31b.

A paired twin clutch 30 composed of a first clutch 30a and a second clutch 30b is configured on the clutch part outer tube 31c. A primary driven gear 29 is disposed at the center of the clutch part outer tube 31c, and clutch outers 30ao and 30bo of the first clutch 30a and the second clutch 30b are disposed on both sides of the primary driven gear 29 in spline fit and with restraints on axial movement.

The primary driven gear 29 at the center is meshed with the primary driving gear 28 disposed on the crankshaft 21.

In addition, a clutch damper spring 29s is interposed between the primary driven gear 29 and a flange part at the center of the clutch part outer tube 31c. Variations in torque between the primary driven gear 29 and the clutch part outer tube 31c are damped by the clutch damper spring 29s.

A clutch inner 30ai of the first clutch 30a is spline fitted to the main shaft inner tube 31a, with restraints on axial movement. A clutch inner 30bi of the second clutch 30b is spline fitted to the main shaft outer tube 31b, with restraints on axial movement.

A friction disc group 30af (30bf) in which co-rotated driving friction discs on the clutch outer 30ao (30bo) side and co-rotated driven friction discs on the clutch inner 30ai (30bi) side are alternately arranged, can be pressed by a pressure plate 30ap (30bp).

An oil hydraulic circuit for selectively driving the pressure plates 30ap and 30bp is formed in the main shaft inner tube 31a, the clutch part outer tube 31c and a right crankcase cover.

When the pressure plate 30ap is driven to press the friction disc group 30af, the clutch 30a is engaged. As a result, power inputted to the primary driven gear 29 is transmitted to the main shaft inner tube 31a, and the driving transmission gears 31g for the odd-numbered speeds are rotated.

On the other hand, when the pressure plate 30bp is driven to press the friction disc group 30bf, the second clutch 30b is engaged. As a result, power inputted to the primary driven gear 29 is transmitted to the main shaft outer tube 31b, and the driving transmission gears 31g for the even-numbered speeds are rotated.

Two of the six driving transmission gears 31g supported on the main shaft 31 are shifter gears which slide in the axial direction. Two of the six driven transmission gears 32g supported on the counter shaft 32 are shifter gears which slide in the axial direction.

Shift forks 33, 33 for moving the two shifter gears on the counter shaft 32 are disposed in the state of being supported on a shift fork shaft 33a.

Shift forks 33, 33 for moving the two shifter gears on the main shaft 31 and a shift fork shaft are also disposed, though not shown in the drawings.

As a shift drum 34 is turned, the four shift forks 33 are moved while being guided by guide grooves formed in an outer circumferential surface of the shift drum 34, whereby meshing of the gears relevant to effective power transmission is changed over.

The shift drum 34 is turned by a shift motor 35.

A driving force of the shift motor 35 is converted into turning of a shift spindle 37 through a speed reduction gear mechanism 36, and the turning of the shift spindle 37 is converted into turning of the shift drum 34 through an intermittent feed mechanism 38.

Therefore, the main transmission Tm can perform transmission with smooth shifting among first to sixth speeds (gear positions), through oil hydraulic control at the twin clutch 30 and drive control at the shift motor 35.

The output shaft of the main transmission Tm is the counter shaft 32 that protrudes forward by penetrating through a front-side wall 22f of the crankcase 22.

The power unit P has the sub transmission Ts disposed forwardly of the main transmission Tm.

The sub transmission Ts has therein a configuration in which a front-side sub transmission case 40f and a rear-side sub transmission case 40r, as front and rear divisional portions, are united together.

Figure 4:
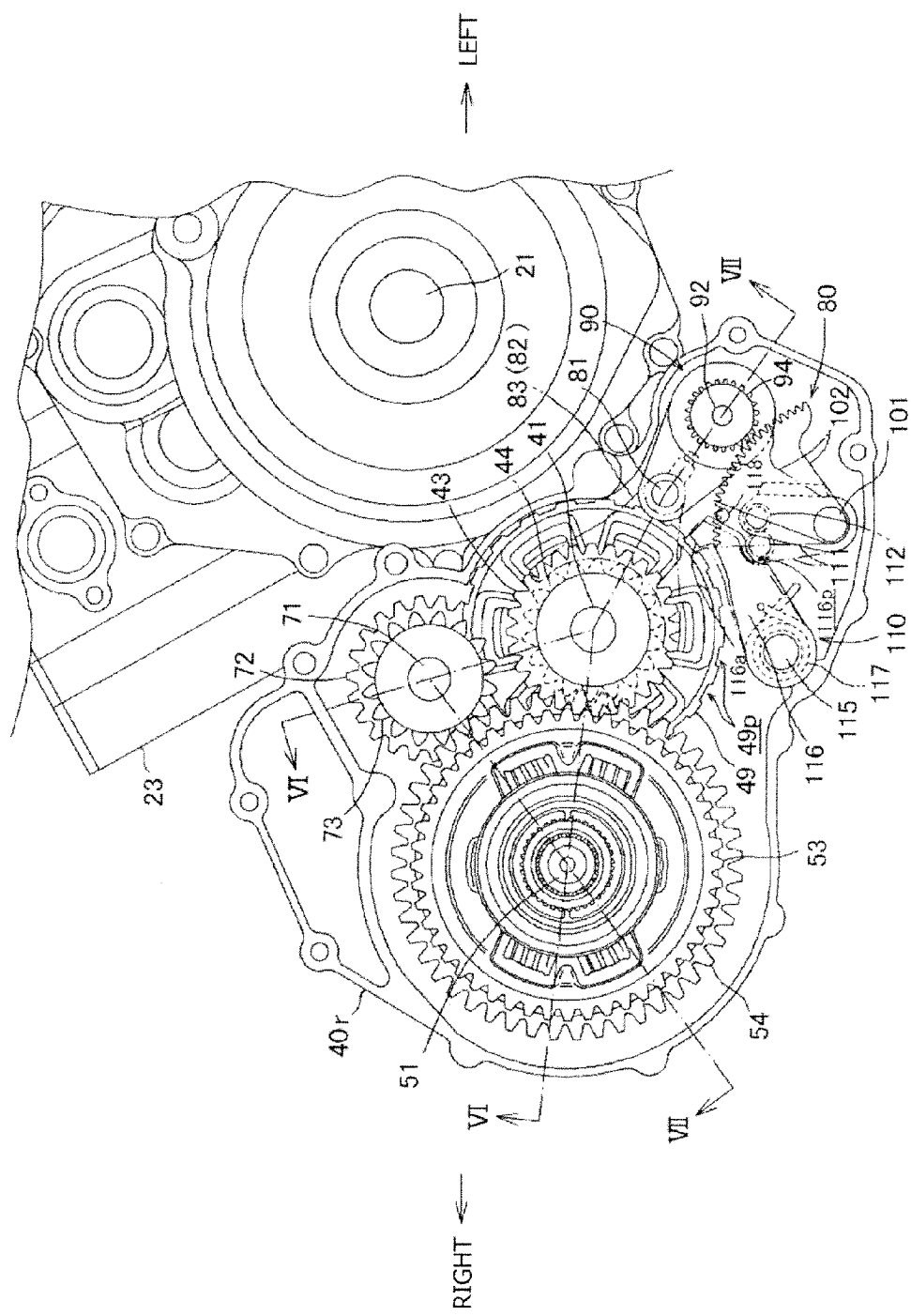
FIG. 4 is a front view of a sub transmission in a state wherein a front-side sub transmission case has been detached.

As shown in FIG. 4, which is a front view showing a state wherein the front-side sub transmission case 40f of the sub transmission Ts has been detached, a transmission driving shaft 41 and a transmission driven shaft 51 whose transmission gears are meshed with each other, of the sub transmission Ts, are juxtaposedly arranged on the left and right sides. An intermediate gear shaft 71 is disposed at a position on an obliquely upper side of the transmission driving shaft 41 and the transmission driven shaft 51 (at a position corresponding to a vertex of a triangle whose vertexes correspond to these three shafts).

Figure 6:
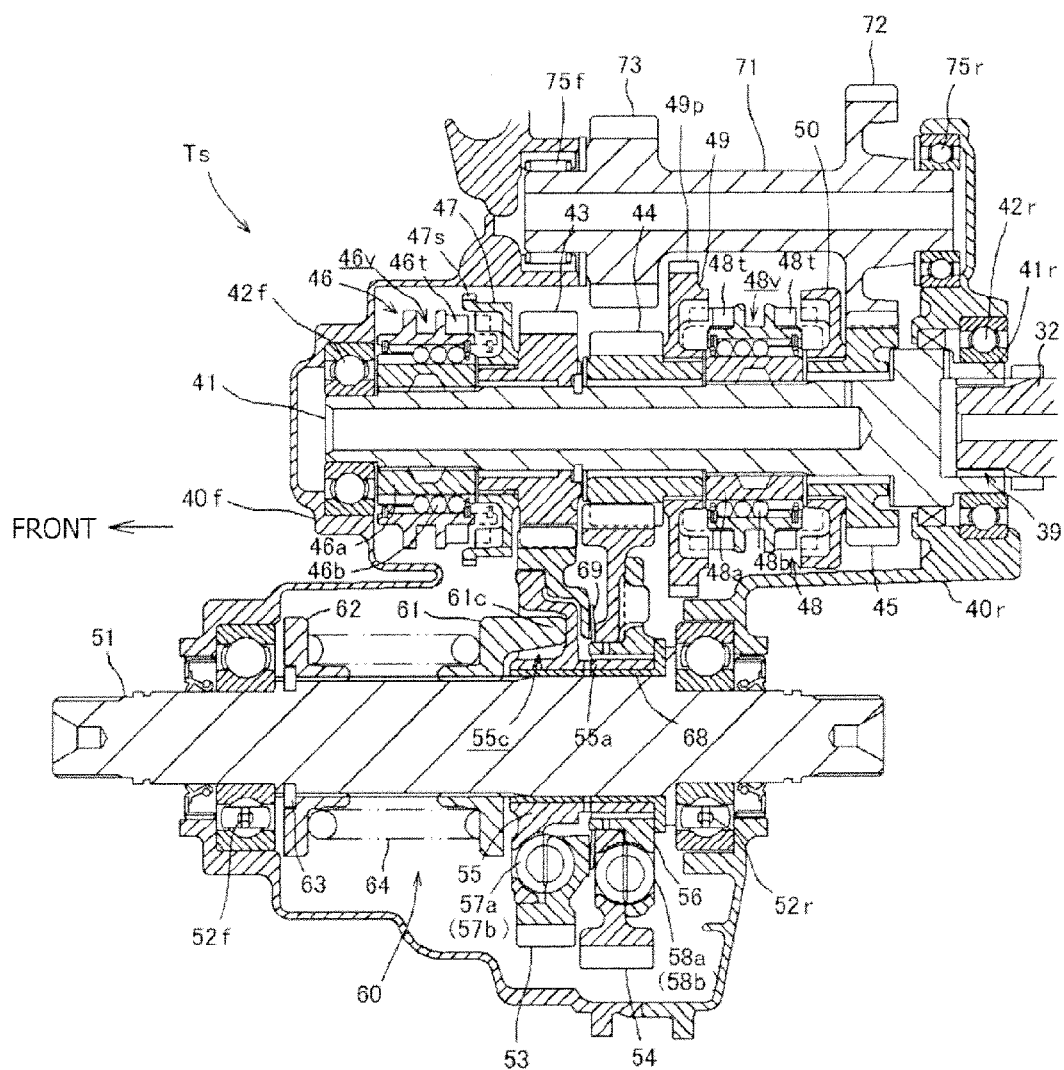
FIG. 6 is a sectional view of the sub transmission taken along line VI-VI of FIG. 4.
Figure 7:
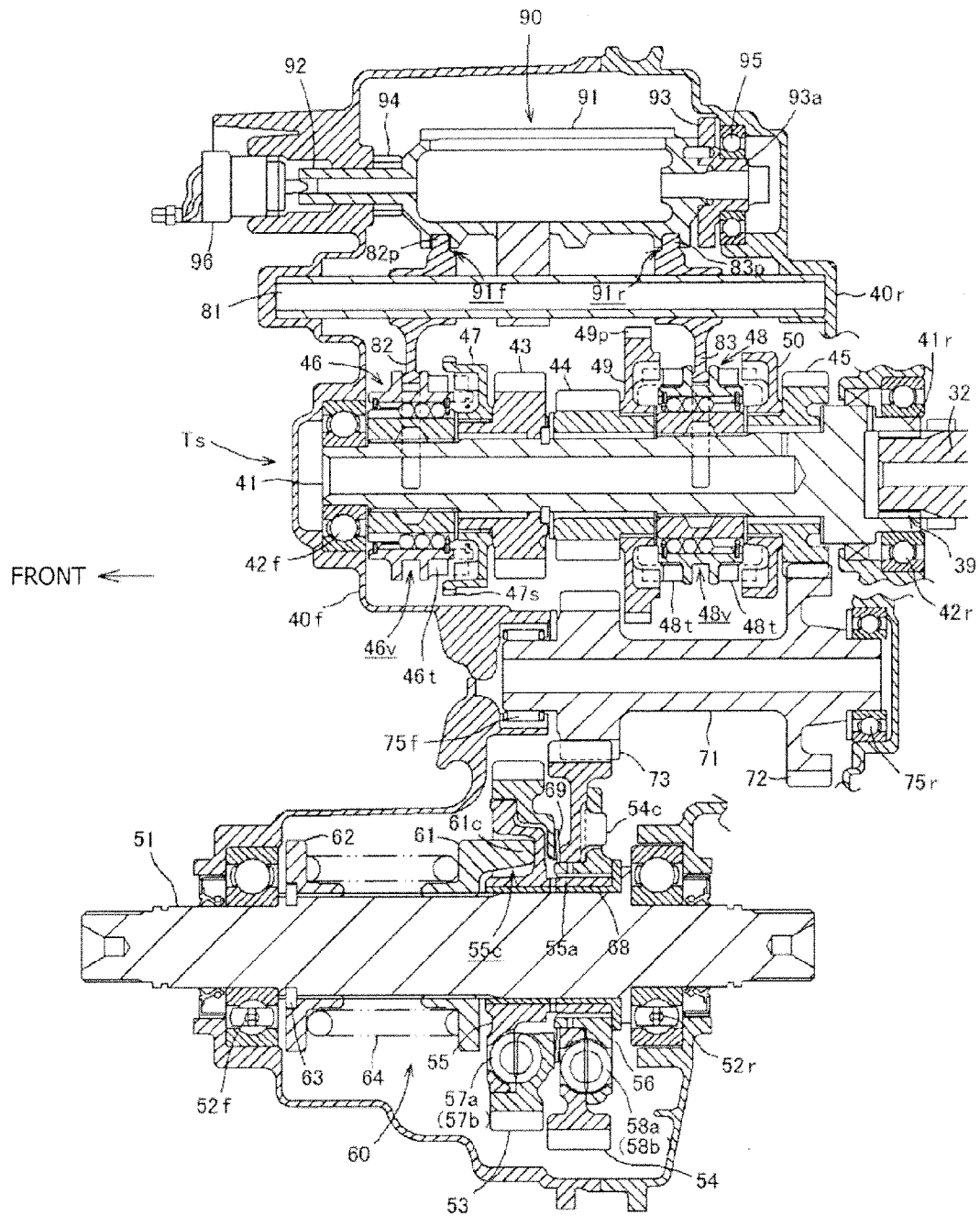
FIG. 7 is a sectional view of the sub transmission taken along line VII-VII of FIG. 4.
Figure 8:
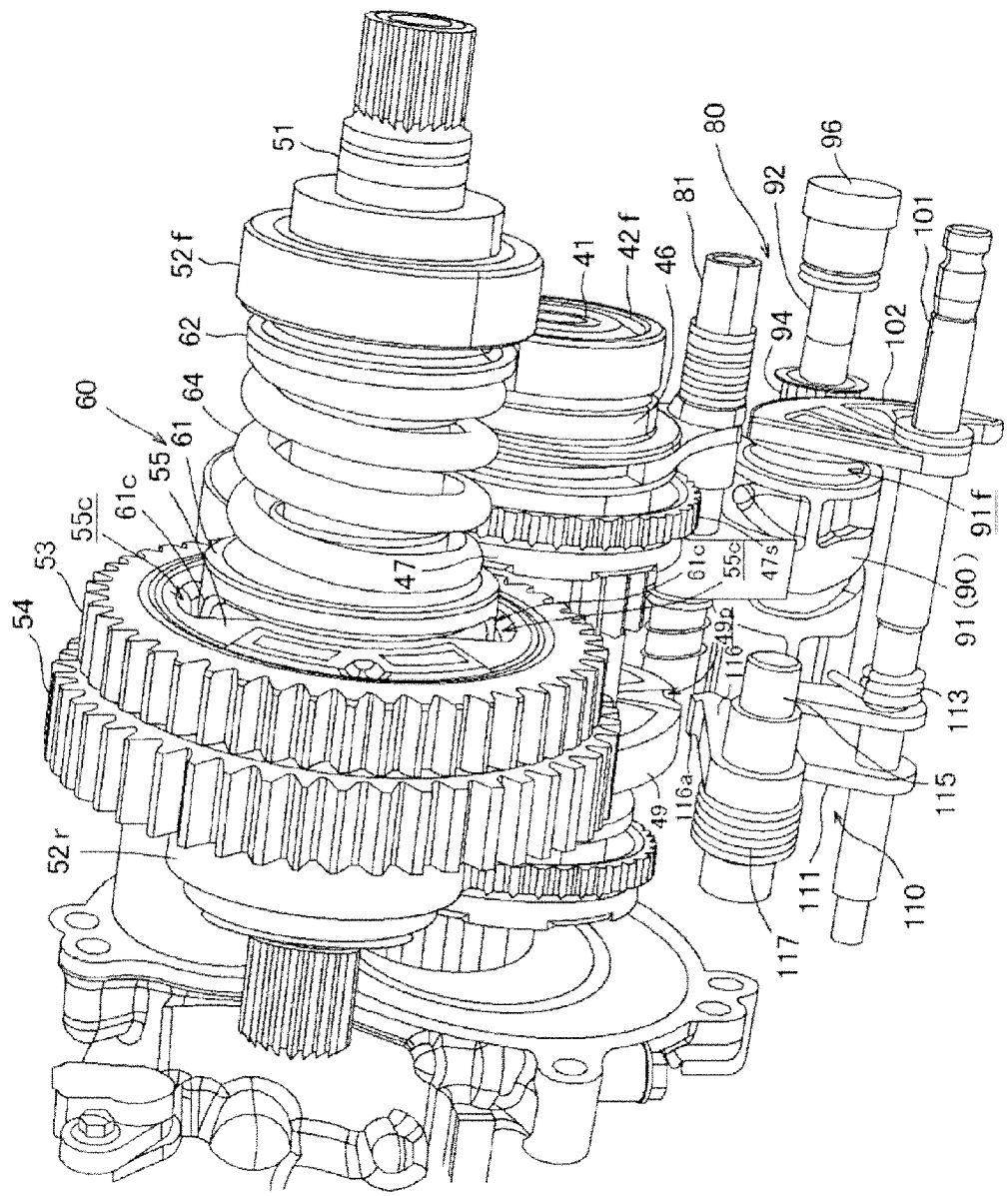
FIG. 8 is a perspective view of the sub transmission.

Referring to FIGS. 6 and 7 which are sectional views of the sub transmission Ts, the transmission driving shaft 41 and the transmission driven shaft 51, and the intermediate gear shaft 71 of the sub transmission Ts are arranged in parallel with each other while being oriented in the longitudinal vehicle direction. In this case, the front and rear ends of these shafts are rotatably supported on the front-side sub transmission case 40f and the rear-side sub transmission case 40r.

The transmission driving shaft 41 is rotatably arranged, with its front end rotatably borne on a bearing 42f fitted in a bearing recess of the front-side sub transmission case 40f, and with its rear end rotatably borne on a bearing 42r fitted in a bearing hole in the rear-side sub transmission case 40r.

A rear end portion of the transmission driving shaft 41 constitutes a rear-end cylindrical portion 41r forming a large-diameter shaft hole. An inner circumferential surface of the rear-end cylindrical portion 41r is splined, which is exposed to the rear side. Of the counter shaft 32 protruding forward by penetrating through the front-side wall 22f of the crankcase 22 of the main transmission Tm, a front end portion which is splined is fitted in a shaft hole in the rear-end cylindrical portion 41r of the transmission driving shaft 41. In this way, the counter shaft 32 is coaxially spline fitted to the transmission driving shaft 41.

Therefore, the counter shaft 32 on the main transmission Tm side and the transmission driving shaft on the sub transmission Ts side are connected with each other at this spline fit part 39, and are rotated as one body.

On a central portion of the transmission driving shaft 41, a high-speed driving gear 43 and a low-speed driving gear 44 are rotatably supported while being juxtaposed on the front and rear sides. On a rear end portion of the transmission driving shaft 41, a reverse driving gear 45 is rotatably supported.

The transmission driving shaft 41 is disposed, between the bearing 42f at the front end and the high-speed driving gear 43, with a high-speed shift clutch mechanism based on a high-speed switching shifter member 46.

The high-speed switching shifter member 46 is axially movably supported on an outer circumference of a cylindrical base portion 46a, which is spline-connected to an axial-directionally predetermined position of the transmission driving shaft 41, through a direct-acting bearing 46b. The high-speed switching shifter member 46 is formed with an annular shift fork groove 46v in a central portion thereof, and with clutch teeth 46t facing toward the rear side of the shift fork groove 46v.

Facing to the clutch teeth 46t, a high-speed shift clutch receiving member 47 is disposed in fit to the high-speed driving gear 43.

Therefore, when the high-speed switching shifter member 46 is moved rearward, the clutch teeth 46t on the rear side are meshed with the high-speed shift clutch receiving member 47 fitted to the high-speed driving gear 43. As a result, the high-speed driving gear 43 is rotated together with the transmission driving shaft 41. When the high-speed switching shifter member 46 is located on the front side, power is not transmitted to the high-speed driving gear 43.

The high-speed shift clutch receiving member 47 is formed on an outer circumferential surface thereof with a plurality of projections 47s at regular intervals. Vehicle speed is detected by detecting the projections 47s by a speed sensor (not shown).

On the other hand, the transmission driving shaft 41 is disposed, between the low-speed driving gear and the reverse driving gear 45, with a low/reverse switching clutch mechanism based on a low/reverse switching shifter member 48.

The low/reverse switching shifter member 48 is axially movably supported on an outer circumference of a cylindrical base portion 48a, which is spline-connected to an axial-directionally predetermined position of the transmission driving shaft 41, through a direct-acting bearing 48. The low/reverse switching shifter member 48 is formed with a shift fork groove 48v between clutch teeth 48t, 48t which are formed facing toward the front and rear sides, respectively.

Facing to the clutch teeth 48t on the front side of the low/reverse switching shifter member 48, a low-speed shift clutch receiving member 49 is disposed in fit to the low-speed driving gear 44. Facing to the clutch teeth 48t on the rear side, a reverse clutch receiving member 50 is disposed in fit to the reverse driving gear 45.

Therefore, when the low/reverse switching shifter member 48 is moved forward, the clutch teeth 48t on the front side are meshed with the low-speed shift clutch receiving member 49 fitted to the low-speed driving gear 44. As a result, the low-speed driving gear is rotated together with the transmission driving shaft 41. When the low/reverse switching shifter member is moved rearward, the clutch teeth 48t on the rear side are meshed with the reverse clutch receiving member 50 fitted to the reverse driving gear 45. As a result, the reverse driving gear 45 is rotated with the transmission driving shaft 41.

When the low/reverse switching shifter member 48 is located in a central position between the low-speed shift clutch receiving member 49 and the reverse clutch receiving member 50 without engagement with any member, rotation of the transmission driving shaft 41 is not transmitted to either of the low-speed driving gear 44 and the reverse driving gear 45.

The low-speed shift clutch receiving member 49 is formed in an outer circumferential surface thereof with a plurality of parking lock grooves 49$p$ arranged along the circumferential direction. The parking lock grooves 49$p$ are used for parking stop, as will be described later.

Of the transmission driven shaft 51 disposed on the right side of and in parallel to the transmission driving shaft 41, a front portion penetrates and is rotatably borne on a bearing 52$f$ fitted in a bearing hole in the front-side sub transmission case 40$f$, whereas a rear portion penetrates and is rotatably borne on a bearing 52$r$ fitted in a bearing hole in the rear-side sub transmission case 40$r$. In this way, the transmission driving shaft 51 is rotatably arranged, with its front and rear ends protruding to the front and rear sides, respectively.

The transmission driven shaft 51 is an output shaft 51 of the sub transmission Ts, and, at the same time, is an output shaft 51 of the power unit P.

A high-speed driven gear 53 and a low-speed driven gear 54, which are constantly meshed respectively with the high-speed driving gear 43 and the low-speed driving gear 44 which are supported on the transmission driving shaft 11, are supported on this transmission driven shaft 51 (see FIG. 6).

Between the high-speed driven gear 53 and the transmission driven shaft 51, a first intermediate rotational member 55 is interposed while being supported on the transmission driven shaft 51 in a mutually relatively rotatable manner.

The first intermediate rotational member 55 is configured as follows. A cylindrical boss part 55$a$ is rotatably supported on the transmission driven shaft 51 through a bush 68, which is a cylindrical bearing. In addition, a spoke part 55$b$ formed at a front half portion of the cylindrical boss part 55$a$ is formed with a pair of forwardly opening cam recesses 55$c$, 55$c$ in center-symmetric positions. Further, rearwardly opening arcuate spring recesses 55$d$ are formed at four positions between the cam recesses 55$c$, 55$c$ in the circumferential direction of the spoke part 55$b$ (see FIGS. 8, 9, and 10).

The spring recesses 55$d$ are partly opened to the rear side.

The high-speed driven gear 53 is rotatably supported on an outer circumference of a flange part 55$b$ of the first intermediate rotational member 55. A spoke part 53$b$ of the high-speed driven gear 53 is formed with forwardly opening spring recesses 53$d$ facing respectively to the spring recesses 55$d$ of the first intermediate rotational member 55. Damper springs 57$a$ (57$b$) are interposed in a bridging manner between both the mutually facing spring recesses 53$d$ and 55$d$.

Figure 10:
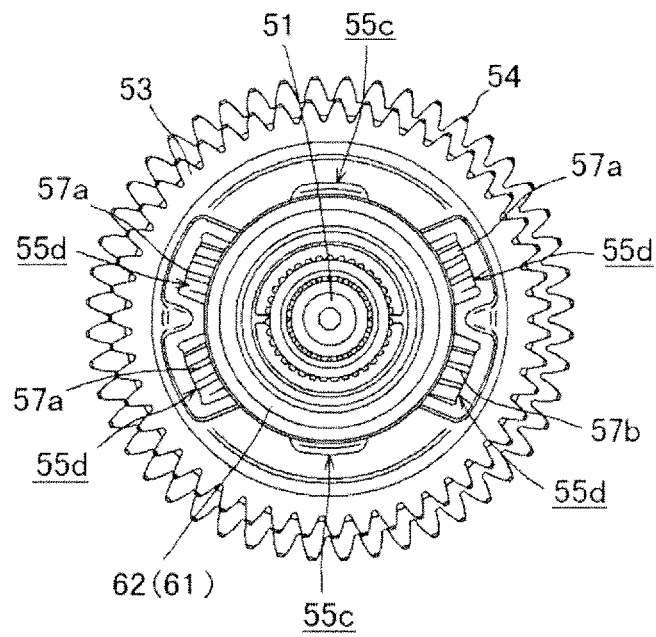
FIG. 10 is a front view of the transmission driven shaft and the member rotatably supported on the transmission driven shaft.

Of the four damper springs 57$a$ (57$b$), the three damper springs 57$a$ differ from the remaining damper spring 57$b$ in spring characteristics (see FIG. 10).

Therefore, rotation of the high-speed driven gear 53 is transmitted through the damper springs 57$a$ (57$b$) to the first intermediate rotational member 55. Between the high-speed driven gear 53 and the first intermediate rotational member, variations in torque are damped by the damper springs 57$a$ (57$b$).

In this instance, since the damper springs 57$a$ and the damper spring 57$b$ differing in spring characteristics are mixedly present, torsional vibrations in a wide vibrational frequency range can be absorbed. As a result, vibration isolation characteristics can be enhanced.

In addition, onto an outer circumference of a rear half of the cylindrical boss part 55$a$ of the first intermediate rotational member 55, a second intermediate rotational member 56 is serration fitted, in such a manner that the second intermediate rotational member 56 is rotated as one body with the first intermediate rotational member 55.

Figure 9:
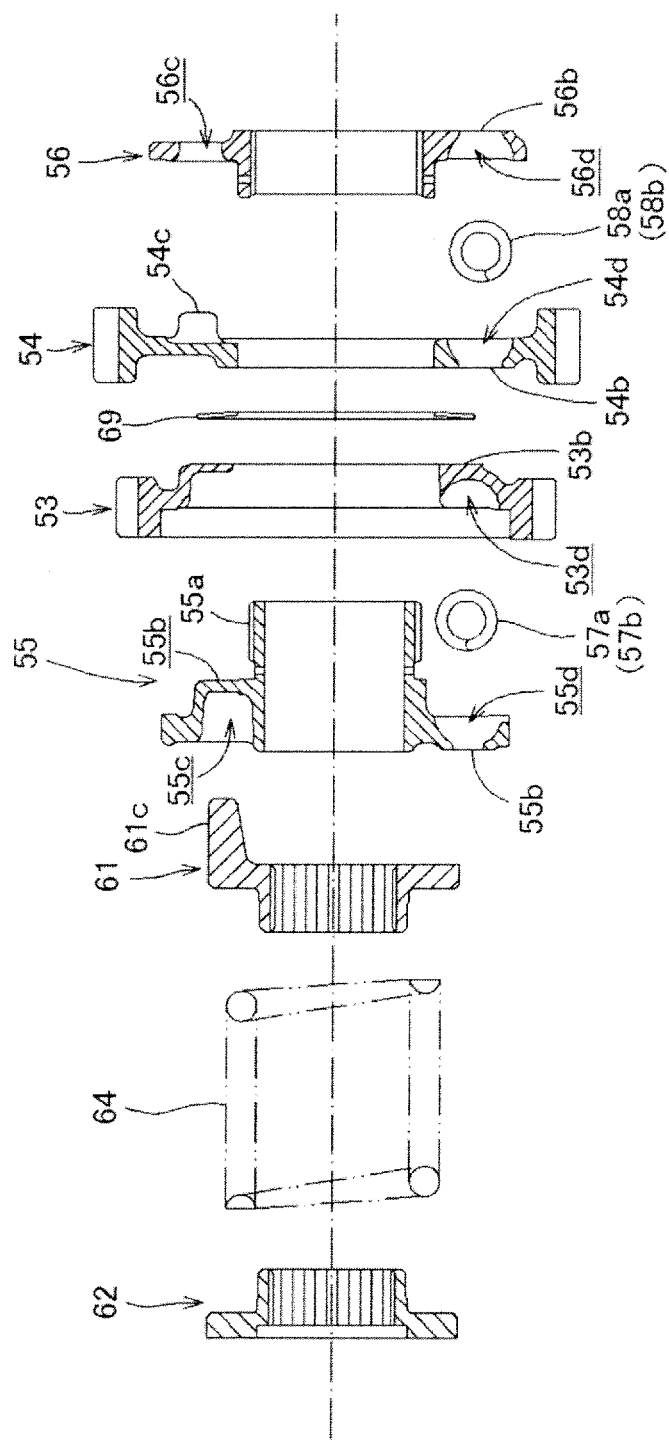
FIG. 9 is an exploded sectional view of a member rotatably supported on a transmission driven shaft.
Figure 11:
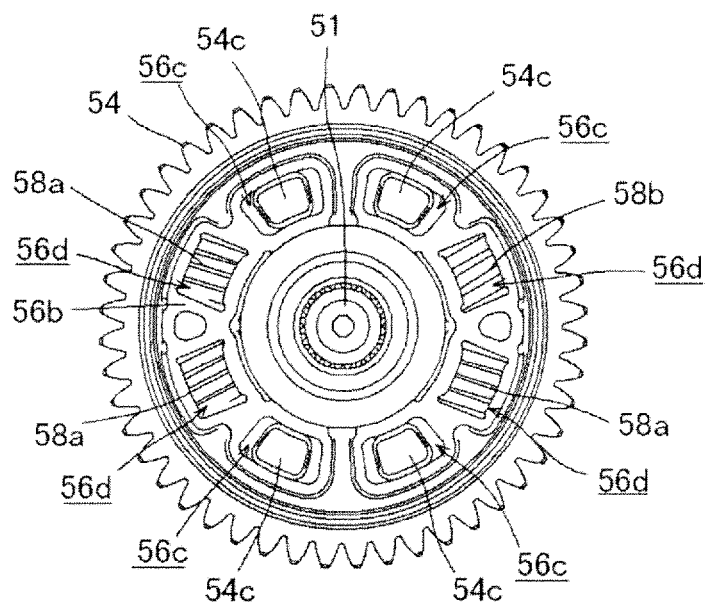
FIG. 11 is a rear view of the transmission driven shaft and the member rotatably supported on the transmission driven shaft, as shown in FIG. 10.

A spoke part 56$b$ of the second intermediate rotational member 56 is formed with arcuate through-holes 56$c$ at four positions, and with forwardly opening arcuate spring recesses 56$d$ at four positions (see FIGS. 9 and 11).

The spring recesses 56$d$ are partly opening to the rear side.

The low-speed driven gear 54 is relatively rotatably supported on an outer circumference of the spoke part 56$b$ of the second intermediate rotational member 56. A spoke part 54$b$ of the low-speed driven gear 54 is formed with rearwardly opening spring recesses 54$d$ facing respectively to the spring recesses 56$d$ of the second intermediate rotational member 56. Damper springs 58$a$ (58$b$) are interposed in a bridging manner between both the mutually facing spring recesses 54$d$ and 56$d$.

Of the four damper springs 58$a$ (58$b$), the three damper springs 58$a$ differ from the remaining damper spring 58$b$ in spring characteristics (see FIG. 11).

A rearwardly projecting projection 54$c$ disposed at the spoke part 54$b$ of the low-speed driven gear 54 is fitted into the through-hole 56$c$ of the second intermediate rotational member 56, with some allowance, to restrict a relative rotational range.

Therefore, rotation of the low-speed driven gear 54 is transmitted through the damper springs 58$a$ (58$b$) to the second intermediate rotational member 56. Between the low-speed driven gear 54 and the second intermediate rotational member 56, variations in torque are damped by the damper springs 58$a$ (58$b$).

In this instance, since the damper springs 58$a$ and the damper spring 58$b$ differing in spring characteristics are mixedly present, torsional vibrations in a wide vibrational frequency range can be absorbed. As a result, vibration isolation characteristics can be enhanced.

Since the second intermediate rotational member is rotated as one body with the first intermediate rotational member 55, the damper springs 58$a$ (58$b$) also serve as springs for damping variations in torque between the low-speed driven gear 54 and the first intermediate rotational member 55.

In addition, a coned disc spring 69 is interposed between the high-speed driven gear 53 and the low-speed driven gear 54, which are adjacent to each other.

The damper spring 57$a$ (57$b$) interposed on the high-speed driven gear 53 and the damper spring 58$a$ (58$b$) interposed on the low-seed driven gear 54 are so set that their mounting dimensions are free lengths, for enhancing their mountability (assembleability). In addition, the coned disc spring 69 is disposed for complementing an initial vibration-isolating effect attendant on variations in torque from the mounted state.

Specifically, by the coned disc spring 69 interposed between the high-speed driven gear 53 and the low-speed driven gear 54, the high-speed driving gear 43, and the low-speed driven gear 54 are biased away from each other and are being pressed against the first intermediate rotational member 55 and the second intermediate rotational member 56, respectively. In this case, when these gears are rotated initially attendant on variations in torque, the rotation is accompanied by a certain degree of resistance. As a result, the initial vibration-isolating effects of the damper spring 57a (57b) and the damper spring 58a (58b) can be complemented.

In the sub transmission Ts in certain embodiments, the coned disc spring 69 is disposed between the high-speed driven gear 53 and the low-speed driven gear 54. This is an excellent structure in which the vibration-isolating effects of the damper spring 57a (57b) and the damper spring 58a (58b) relevant to both the high-speed driven gear 53 and the low-speed driven gear 54 are complemented by the single cone disc spring 69.

Thus, of the high-speed driving gear 43 (the low-speed driving gear 44) and the high-speed driven gear (the low-speed driven gear 54) constituting a pair of gears constantly meshed with each other, the high-speed driven gear 53 (the low-speed driven gear 54) on one side is made to be a gear accompanied by the damper springs 57a and 57b (58a and 58b) interposed between it and the transmission driven shaft 51. Therefore, the high-speed driven gear 53 (the low-speed driven gear 54) is composed of separate bodies divided by the damper springs 57a and 57b (58a and 58b). This ensures that the inertial mass of the sub transmission Ts as a whole is reduced. As a result, reaction forces of driving and torque variations attendant on a gear shift themselves can be suppressed to low levels, and it is possible to easily lower the vibration of the sub transmission Ts and, hence, the vibration of the power unit P.

The damper springs 57a and 57b (58a and 58b) are disposed between the high-speed driven gear 53 (the low-speed driven gear 54) and the transmission driven shaft 51, and they need not be disposed respectively, for example, on the input side and the output side of the sub transmission Ts. Consequently, the size of the sub transmission Ts and, hence, the size of the power unit P, can be reduced.

Furthermore, the transmission driven gear 51 is equipped with a cam-type torque damper 60, which is interposed between the transmission driven shaft 51 and the first intermediate rotational member 55.

On that portion of the transmission driven shaft 51 which is located on the right side of the first intermediate rotational member 55, a male cam member 61 is supported through spline fit such as to be slidable in the axial direction but restrained from mutual rotation. The male cam member 61 has cam projections 61c, 61c fronting on the cam recesses 55c, 55c of the first intermediate rotational member 55, which faces to the male cam member 61 from the rear side.

The cam projections 61c, 61c of the male cam member 61 each project while having a cam surface of which a side surface facing in the rotational direction is inclined toward the rear side.

On the front side of the male cam member 61, a spring receiving member 62 is spline fitted to the transmission driven shaft 51, in the state of being restrained by a stop ring 63 from moving forward. A coil spring 64 is interposed between the spring receiving member 62 and the male cam member 61 (see FIGS. 6 and 7).

Therefore, the male cam member 61 is biased rearward by the coil spring 64, whereby the cam projections 61c, 61c are inserted in the cam recesses 55c, 55c of the first intermediate rotational member 55. In addition, the cam surfaces of the cam projections 61c, 61c are set in contact with those surfaces of the cam recesses 55c, 55c which faces in the rotational direction. In this manner, the cam-type torque damper 60 is configured.

Accordingly, even in the case where the torque transmitted from the drive wheel side to the transmission driven shaft 51 (which is an output shaft) is rapidly varied (increased or decreased), a damping action between the transmission driven shaft 51 and the first intermediate rotational member 55 is offered by cam contact between the cam projections 61c, 61c of the male cam member 61 and the cam recesses 55c, 55c of the first intermediate rotational member 55, in the cam-type torque damper 60. This ensures that the influence of the torque variation on the sub transmission Ts on the upstream side relative to the first intermediate rotational member 55 is suppressed. In addition, variations in torque attendant on a gear shift are also suppressed. As a result, gear shifting can be carried out smoothly.

Further, the damper springs 57a and 57b are interposed between the first intermediate rotational member 55 and the high-speed driven gear 53. In addition, the damper springs 58a and 58b are interposed between the second intermediate rotational member 56 (which is rotated as one body with the first intermediate rotational member 55) and the low-speed driven gear 54. Thus, a double arrangement of the cam-type torque damper and the damper springs 57a, 57b, 58a, and 58b is interposed between the transmission driven shaft 51 and the high-speed driven gear 53 and, also, between the transmission driven shaft 51 and the low-speed driven gear 54.

The double torque damper arrangement makes it possible to further suppress variations in torque attendant on gear shifting and variations in torque from the drive wheel side, to enable smooth gear shifting, and to reduce vibrations of the sub transmission Ts and the power unit P.

In addition, since the cam-type torque damper and the damper springs 57a, 57b, 58a, and 58b are compactly incorporated on the inside of the high-speed driven gear 53 and the low-speed driven gear 54 around the transmission driven shaft 51, it is possible to contrive reductions in size in regard of the sub transmission Ts and the power unit P.

Referring to FIG. 6, of the intermediate gear shaft 71 located on an oblique upper side of the transmission driving shaft 41 and the transmission driven shaft 51, the front end is borne by the bearing 75f fitted in the bearing recess in the front-side sub transmission case 40f, whereas the rear end is borne by the bearing 75r fitted in the bearing recess in the rear-side sub transmission case 40r, whereby the intermediate gear shaft 71 is rotatably supported (see FIGS. 6 and 7).

The intermediate gear shaft 71 is formed with a large-diameter intermediate gear 72 at a rear portion thereof, and with a small-diameter intermediate gear 73 at a front portion thereof. The large-diameter intermediate gear 72 on the rear side is meshed with the reverse driving gear 45 rotatably supported on the transmission driving shaft 41 (see FIG. 6). The small-diameter intermediate gear 73 on the front side is meshed with the low-speed driven gear 54 rotataby supported on the transmission driven shaft 51 (see FIG. 7).

A shift drive mechanism 80 by which the high-speed switching shifter member 46 and the low/reverse switching shifter member 48 on the transmission driving shaft 41 are moved in the axial direction is disposed on the left side (the right side in FIG. 4) of the transmission driving shaft 41, in other words, on the lower side on the crankshaft 21 side.

A shift fork shaft 81 penetrates, and axially slidably supports, the shift fork 82 fitted in the shift fork groove 46v in the high-speed switching shifter member 46, and the shift fork 83 fitted in the shift fork groove 48v in the low/reverse switching shifter member 48. The shift fork shaft 81 is mounted at a position on an oblique left lower side of the transmission driving shaft 41, with its front and rear ends supported by the front-side sub transmission case 40f and the rear-side sub transmission case 40r (see FIGS. 4 and 7).

A shift drum 90 is disposed on a further left lower side of the shift fork shaft 81 (see FIG. 4).

Referring to FIG. 7, the shift drum 90 has a drum support shaft 92 projecting forward from the front end of a cylindrical drum body 91. The drum support shaft 92 penetrates, and is rotatably borne by, the front-side sub transmission case 40f. A flower-shaped cam 93 is firmly attached to the rear end of the drum body 91. A center shaft 93a projecting to the rear side of the flower-shaped cam 93 is borne in a bearing recess of the rear-side sub transmission case 40r through a bearing 95.

A shift drum input gear 94 is fitted to the drum support shaft 92 (projecting to the front side of the shift drum 90) along an inner surface of the front-side sub transmission case 40f.

In addition, that front end of the drum support shaft 92 which penetrates, and protrudes from, the front-side sub transmission case 40f is coaxially connected to a driving shaft of a shift position sensor 96. The turning angle of the shift drum 90 is detected by the shift position sensor 96.

An outer circumferential surface of the drum body 91 is formed with guide grooves 91f and 91r located respectively on the front and rear sides and having required shapes along the circumferential direction. Projectingly formed engaging pin parts 82p and 83p of the shift forks 82 and 83 are slidably engaged in the guide grooves 91f and 91r. With the shift drum 90 rotated, the shift forks 82 and 83 are moved in the axial direction while being guided respectively by the guide grooves 91f and 91r, so as to move the high-speed switching shifter member 46 and the low/reverse switching shifter member 48, thereby performing a gear shift.

Referring to FIG. 4, a shift spindle 101 is arranged on the lower side of the shift fork shaft 81, with its front and rear ends rotatably borne on the front-side sub transmission case 40f and the rear-side sub transmission case 40r. The base end of the shift operating lever 100 is fitted to that front end of the shift spindle 101 which penetrates, and protrudes forward from, the front-side sub transmission case 41 (see FIG. 3).

A sector-shaped gear shift arm 102 is fitted to a predetermined position of the shift spindle 101. The gear shift arm 102 is meshed with the shift drum input gear 94 fitted to the drum support shaft 92 projecting to the front side of the shift drum 90 (see FIG. 8).

In addition, on the shift spindle 101, a parking operation arm 111 is swingably supported rearwardly of the gear shift arm 102. A torsion spring 113 is interposed between the shift spindle 101 and the parking operation arm 111 so that turning of the shift spindle 101 is transmitted to and converted into swinging of the parking operation arm 111 through the torsion spring 113 (see FIG. 8).

A roller 112 is rotatably supported on the tip end of the parking operation arm 111 (see FIG. 4).

Referring to FIG. 4, on the right side of the shift spindle 101 and on the lower side of the transmission driving shaft 41, a lever support shaft 115 is arranged while being oriented in the longitudinal vehicle direction, with its front and rear ends supported respectively on the front-side sub transmission case 40f and the rear-side sub transmission case 40r. In addition, a parking lock lever 116 is swingably arranged, with its base end supported on the lever support shaft 115.

Referring to FIG. 4, which is a front view, the parking lock lever 116 is disposed to extend obliquely upward between the low-speed shift clutch receiving member 49 and the parking operation arm 111, from its base end, which end is located at the same position in the longitudinal vehicle direction as the low-speed shift clutch receiving member 49 supported on the transmission driving shaft 41, and is supported by the lever support shaft 115.

An outer circumferential surface of the low-speed shift clutch receiving member 49 is formed with a plurality of parking lock grooves 49p arrayed in the circumferential direction.

The parking lock lever 116 is biased clockwise, in front view, by a torsion spring 117 wound around the lever support shaft 115. The parking lock lever 116 has its tip end contacted by a stopper 118 projected at a predetermined position from the rear-side sub transmission case 40r, whereby swinging of the parking lock lever 116 is restricted.

A locking projection 116a is projectingly formed at that edge of the parking lock lever 116 which faces to the outer circumferential surface of the low-speed shift clutch receiving member 49. At that edge of the parking lock lever 116 on the opposite side which faces the parking operation arm 111, a parking recess 116p is formed in an inclined surface contacted by the roller 112 disposed at the tip end of the parking operation arm 111 (see FIG. 4).

The parking operation arm 111, the parking lock lever 116, and the parking lock groove 49p of the low-speed shift clutch receiving member 49 constitute a parking drive mechanism 110.

FIG. 4 shows the sub transmission Ts being in a neutral state. In this state, the parking lock lever 116 biased by the torsion spring 117 is in contact with the stopper 118, and separate from the outer circumferential surface of the low-speed shift clutch receiving member 49.

Referring to FIG. 4, when the shift spindle 101 is turned counterclockwise to cause the parking operation arm 111 to swing rightward (leftward in FIG. 4) and the roller 112 at the tip end of the parking operation arm 111 makes contact with the inclined surface of the parking lock lever 116 and rolls, the parking lock lever 116 is swung obliquely upward. In this instance, the locking projection 116a of the parking lock lever 116 is pressed by the outer circumferential surface of the low-speed shift clutch receiving member 49 and is engaged with the parking lock groove 49p, resulting in that the parking lock lever 116 restrains rotation of the low-speed shift clutch receiving member 49.

The state indicated by two-dotted chain lines in FIG. 4 shows a parking state wherein rotation of the low-speed shift clutch receiving member 49 is prohibited.

Specifically, when rotation of the low-speed shift clutch receiving member 49 is restrained, referring to FIG. 6, the low-speed driving gear 44 integral with the low-speed shift clutch receiving member 49 is also restrained from rotation, so that the low-speed driven gear 54 meshed with the low-speed driving gear 44 is restrained from rotation. Therefore, the transmission driven shaft (output shaft) 51 interlocked with the low-speed driving gear 54 through the damper springs 57a, 57b, 58a, and 58b and the cam-type torque damper 60 is restrained from rotation. As a result, a parking state is established.

Thus, rotation of the transmission driven shaft (output shaft) 51 is restrained through the meshing between the low-speed driving gear 44 and the low-speed driven gear 54, which are set to have a high transmission gear ratio. Therefore, rotation of the transmission driven shaft (output shaft) 51 can be restrained with a comparatively strong force at the time of parking.

On the other hand, the turning of the shift spindle 101 causes turning of the gear shift arm 102 fitted to the shift spindle 101, which causes the shift drum input gear 94 meshed with the gear shift arm 102 to turn together with the shift drum 90. This causes the shift forks 82 and 83 to be guided respectively by the guide grooves 91*f* and 91*r* of the shift drum 90, whereby the high-speed switching shifter member 46 and the low/reverse switching shifter member 48 are moved, to make a gear shift.

The above-mentioned parking state is set by this turning of the shift spindle 101.

The shift operating lever 100 fitted to the forwardly projecting front end of the shift spindle 101 is connected to the shift cable 121 extending from the parking operation lever 120 disposed at the operation panel 130, as above-mentioned, and the shift spindle 101 is turned by an operation of the parking operation lever 120.

Figure 12:
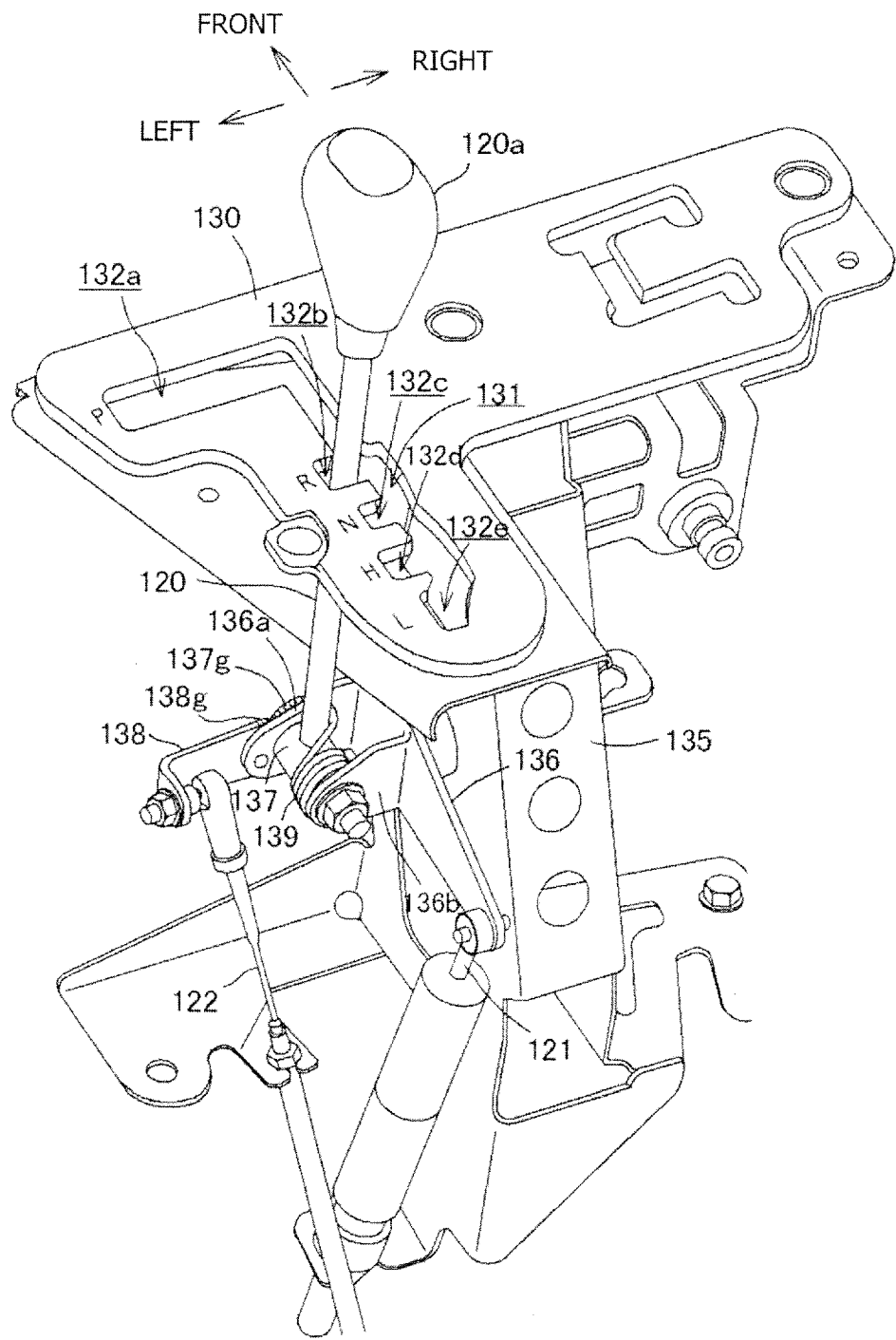
FIG. 12 is a perspective view showing an operating mechanism of a parking operation lever.

An operating mechanism of the parking operation lever 120 is illustrated in FIG. 12 and will be described below.

The operation panel 130 is formed with a longitudinal slot 131 which is elongated in the longitudinal vehicle direction (front-rear direction). At the front end of the longitudinal slot 131, a long recess 132*a* is formed which extends horizontally after bending to the left side. At the left side edge of the longitudinal slot 131, short recesses 132*b*, 132*c*, 132*d*, and 132*e* are formed in this order from the front side toward the rear side.

The long recess 132*a* at the front end is a parking position. As for the short recesses arranged along the direction from the front side toward the rear side, the short recess 132*b* is a reverse position, the short recess 132*c* is a neutral position, the short recess 132*d* is a high-speed forward position, and the short recess 132*e* is a low-speed forward position.

A support column 135 extends downward from the operation panel 130, and a swing lever 136 has its front end supported on a left side surface of the support column 135. One end of the shift cable 121 is bound to a vertically swingable rear end of the swing lever 136.

At a base end portion of the swing lever 136, a pair of front and rear brackets 136*a* and 136*b* are disposed to project leftward. A swing pivot shaft 137 is turnably arranged between the pair of front and rear brackets 136*a* and 136*b*. The parking operation lever 120 penetrates the longitudinal slot 131 roughly vertically. Of the parking operation lever 120, the upper end is a grip 120*a*, and the lower end is firmly attached to the swing pivot shaft 137.

On the bracket 136*a*, a swing lever 138 extends leftward, with its base end swingably supported on a pivot shaft 140. A gear 137*g* fitted to the swing pivot shaft 137 and a gear 138*g* formed at the base end of the swing lever 138 are meshed with each other. One end of the parking cable 122 is bound to a vertically swingable left end of the swing lever 138.

The parking operation lever 120 can be swung toward the front and rear sides through swinging of the swing lever 136, and can be swung toward the left and right sides through swinging of the swing lever 138 which is integral with the swing pivot shaft 137.

A torsion coil spring 139 is wound around the swing pivot shaft 137. One end of the torsion coil spring 139 is locked to the bracket 136*b*, whereas the other end is locked to the parking operation lever 120. In this way, the torsion coil spring 139 is biasing the parking operation lever 120 toward the left side.

Therefore, under the function of the torsion coil spring 139, the parking operation lever 120 is fitted into and stabilized in one of the long recess 132*a* and the short recesses 132*b*, 132*c*, 132*d*, and 132*e* which are formed to extend leftward from the longitudinal slot 131.

With the parking operation lever 120 operated toward the front or rear side along the longitudinal slot 131, the swing lever 136 is swung vertically, to cause a pushing/pulling operation of the shift cable 121. In this case, the shift operating lever 100 disposed at a front surface of the sub transmission Ts is swung toward the left or right side, to turn the shift spindle 101, whereby a gear shift and a parking stop can be performed, as above-mentioned.

When the parking operation lever 120 is swung forward to the front end of the longitudinal slot 131, the torsion coil spring 139 causes the parking operation lever 120 to swing leftward within the long recess 132*a* into the parking position. This leftward swing of the parking operation lever 120 causes an upward swing of the swing lever 138 through the meshing between the gars 137*g* and 138*g*, leading to a pulling operation of the parking cable 122. As a result, the differential lock mechanism 160 added to the rear differential gear unit 9 on the rear side of the vehicle body is operated.

Figure 13:
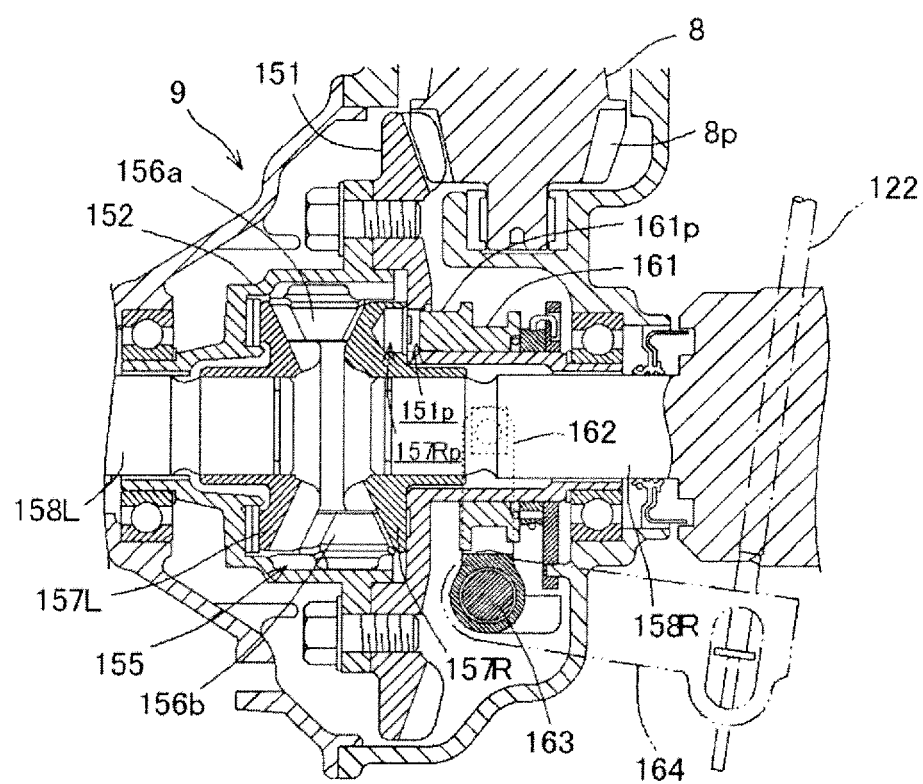
FIG. 13 is a sectional view of a rear differential device.

Referring to FIG. 13, the rear differential gear unit 9 has a configuration wherein a differential case 152 is integrally attached to a ring gear 151 rotated through meshing with a pinion gear 8*p* disposed at the rear end of the rear drive shaft 8, and a differential mechanism part 155 is disposed inside the differential case 152.

The differential mechanism part 155 includes two kinds of input-side blocks 156*a* and 156*b* rotated as one body with the differential case 152. The differential mechanism part 155 also includes left and right output-side cams 157L and 157R capable of independent rotation through frictional forces between themselves and the input-side blocks 156*a* and 156*b*. Left and right rear axles 158L and 158R are fitted respectively in shaft holes formed in the left and right output-side cams 157L, 157R, for integral rotation with the latter.

In the case where no difference in rotating speed is generated between the left and right output-side cams 157L, 157R, the input-side blocks 156*a* and 156*b* and the left and right output-side cams 157L and 157R are not put into relative rotations but put into integral rotation. Where a difference in rotating speed is generated between the left and right output-side cams 157L and 157R, on the other hand, the input-side blocks 156*a* and 156*b* show relative rotations while generating frictional forces between themselves and the left and right output-side cams 157L and 157R, respectively.

The differential lock mechanism 160 is incorporated in this rear differential gear unit 9.

The ring gear 151 has a cylindrical boss part 151*b* relatively rotatably fitted onto the outer circumference of a cylindrical part constituting a shaft hole of the right output-side cam 157R. An annular member 161 is fitted onto an outer circumferential surface of the cylindrical boss part 151*b* in an axially slidable manner. The annular member 161 is disposed with three leftwardly projecting lock pins 161*p* which are arrayed in the circumferential direction. The ring gear 151 is disposed with pin holes 151*p* at portions facing to the three lock pins 161*p*, and the lock pins 161*p* are inserted in the pin holes 151*p*.

The right output-side cam 157R is also disposed with three rightwardly opening pin holes 157R*p*. Depending on the relative rotational position of the right output-side cam 157R relative to the ring gear 151, the three pin holes 157Rp in the right output-side cam 157R come to be coaxial with the three pin holes 151p in the ring gear 151. When the lock pins 161p are inserted into the pin holes 157Rp in the right output-side cam 157R, each lock pin 161p is inserted in both of the two pin holes 161p and 157Rp, whereby the ring gear 151 and the right output-side cam 157R are interconnected and rotated as one body. Therefore, the left output-side cam 157L is also rotated as one body with them, since it is connected to them through the input-side blocks 156a and 156b. As a result, a differential lock state in which differential operation is stopped is established.

A fork member 162 which is engaged with an engaging groove in the annular member 161 having the lock pins 161p of the differential lock mechanism 160, and which moves the annular member 161, has its base end fitted to a lever shaft 163. An end portion of the parking cable 122 is bound to the tip end of a leer member 164 fitted to this lever shaft 163.

Therefore, when a pulling operation is applied to the parking cable 122 by the parking operation lever 120, the lever member 164 turns the lever shaft 163. The turning of the lever shaft 163 causes a leftward sliding of the annular member 161 through the fork member 162. As a result, the lock pins 161p inserted in the pin holes 151p in the ring gear 151 are inserted into the pin holes 157Rp in the right output-side cam 157R, to stop a differential operation, thereby establishing a differential lock state.

Specifically, referring to FIG. 12, when the parking operation lever 120 is swung forward to the front end of the longitudinal slot 131 and swung leftward within the long recess 132a to come into the parking position, a pulling operation of the parking cable 122 is brought about. As a result, the differential lock mechanism 160 added to the rear differential gear unit 9 on the rear side of the vehicle body is operated, to establish a differential lock state.

When the parking operation lever 120 is swung forward to the front end of the longitudinal slot 131, a pulling operation of the shift cable 121 is brought about. By this, the shift operating lever 100 fitted to the front end of the shift spindle 101 penetrating the sub transmission case 41 to protrude forward is swung to the right side. This causes the shift spindle 101 to turn, whereby the parking operation arm 111 is swung rightward (leftward in FIG. 4), as above-mentioned. The parking operation arm 111 thus swung rightward, acts on the parking lock lever 116 so that the locking projection 116a of the parking lock lever 116 is engaged into the parking lock groove 49p in the outer circumferential surface of the low-speed shift clutch receiving member 49, resulting in a parking state wherein rotation of the low-speed shift clutch receiving member 49 is prohibited. Namely, there is established a parking state wherein rotation of the transmission driven shaft (output shaft) 51 is restrained, as above-mentioned. Therefore, rotation of the rear drive shaft 8 is restrained.

The parking brake system in certain embodiments is configured as above. Therefore, when the parking operation lever 120 is put into the parking position, the sub transmission Ts is put into the parking state, so that rotation of the rear drive shaft 8 is restrained. Simultaneously, the differential lock mechanism 160 added to the rear differential gear unit 9 is operated to make a differential lock state, in which a differential operation is stopped. Consequently, the left and right rear wheels 3, 3 are fixed. Thus, an assured parking brake state is established.

While the parking state established by operating the parking operation lever 120 has been described above, other shift operations than the parking will be described below.

FIGS. 4 to 7 show a state wherein the gear is in the neutral position. In this state, the parking operation lever 120 is located in the short recess 132c in the operation panel 130.

When the parking operation lever 120 is swung one step forward from this state and thereby put into the short recess 132b to rest in a reverse position, a pulling operation of the shift cable 121 is effected to turn the shift spindle 101, whereby the gear shift arm 102 is swung rightward. The gear shift arm 102 thus swung rightward turns the shift drum 90 through the meshing with the shift drum input gear 94. This causes the low/reverse switching shifter member 48 to move rearward, referring to FIG. 7, into engagement with the reverse clutch receiving member 50. Therefore, rotation of the transmission driving shaft 41 is transmitted to the intermediate gear shaft 71 through the meshing between the reverse driving gear 45 and the large-diameter intermediate gear 72. The rotation of the intermediate gear shaft 71 is transmitted to the transmission driven shaft (output shaft) 51 through the meshing between the small-diameter intermediate gear 73 and the low-speed driven gear 54.

Accordingly, the rotation of the transmission driving shaft 41 is transmitted through the intermediate gear shaft 71 to put the transmission driven shaft (output shaft) 51 into reverse rotation, establishing a reverse state.

When the parking operation lever 120 is swung further forward from this reverse state, the above-mentioned parking state is established.

On the other hand, when the parking operation lever 120 is swung one step rearward from the neutral state and thereby put into the short recess 132c to rest in a high-speed forward position, a pushing operation of the shift cable 121 is effected to turn the shift spindle 101, whereby the gear shift arm 102 is swung leftward. The gear shift arm 102 thus swung turns the shift drum 90 through the meshing with the shift drum input gear 94. This causes the high-speed switching shifter member 46 to move rearward, referring to FIG. 6, into engagement with the high-speed shift clutch receiving member 47. Therefore, rotation of the transmission driving shaft 41 is transmitted to the transmission driven shaft (output shaft) 51 through the meshing between the high-speed driving shaft 43 and the high-speed driven shaft 53. Thus, a high-speed forward gear state is established.

When the parking operation lever 120 is swung further rearward from this high-speed forward state and thereby put into the short recess 132d to rest in a low-speed forward gear position, a further pushing operation of the shift cable 121 is brought about, leading to a further turning of the shift drum 90. This causes the high-speed switching shifter member 46 to move forward, referring to FIG. 6, to be thereby disengaged from the high-speed shift clutch receiving member 47. In this case, the low/reverse switching shifter member 48 is moved forward into engagement with the low-speed shift clutch receiving member 49. Therefore, rotation of the transmission driving shaft 41 is transmitted to the transmission driven shaft (output shaft) 51 through the meshing between the low-speed driving gear 44 and the low-speed driven gear 54. Thus, a low-speed forward gear state is established.

According to the sub transmission Ts in this embodiment, the above-mentioned gear shifts are carried out by manual operations of the parking operation lever 120.

The high-speed forward gear state is operated with two wheel drive, while the low-speed forward gear state and the reverse gear state are operated with four wheel drive.

In the sub transmission Ts in this embodiment, as shown in FIGS. 6 and 7, the cam-type torque damper 60 and the damper springs 57a, 57b, 58a, and 58b are disposed between the transmission driven shaft 51 and the high-speed driven gear 53 as well as the low-speed driven gear 54 on one side, of the meshed pairs of the transmission driving gears 43 and 44 and the transmission driven gears 53 and 54. Thus, the high-speed driven gear and the low-speed driven gear 54 are composed of separate bodies divided by the torque dampers 60, 57a, 57b, 58a, and 58b, and, therefore, the inertial mass of the transmission as a whole is reduced. Accordingly, torque variations attendant on reaction forces of driving and on a gear shift can themselves be suppressed to low levels, and the vibrations of the power unit P can be easily reduced.

In addition, the torque dampers 60, 57a, 57b, 58a, and 58b are disposed between the high-speed driven gear 53 as well as the low-speed driven gear 54 and the transmission driven shaft 51, and need not be disposed respectively, for example, on the input side and the output side of the sub transmission Ts. Consequently, the power unit P can be reduced in size.

The cam-type torque damper 60 is interposed between the transmission driven shaft 51 and the first and second intermediate rotational members 55 and 56, whereas the damper springs 57a, 57b, 58a, and 58b are interposed between the first and second intermediate rotational members 55 and 56 and the high-speed driven gear 53 as well as the low-speed driven gear 54. Thus, a double torque damper including the cam-type torque damper and the damper springs 57a, 57b, 58a, and 58b is configured (see FIGS. 6 and 7). By this double torque damper, torque variations attendant on a gear shift are suppressed to further lower levels. As a result, vibrations of the power unit P can be more reduced. In addition, since the cam-type torque damper 60 and the damper springs 57a, 57b, 58a, and 58b are mounted between the high-speed driven gear 53 as well as the low-speed driven gear 54 and the transmission driven shaft 51 in a compact form, the power unit P can be maintained in a small size.

In the area between the transmission driven shaft 51 and the high-speed driven gear 53 as well as the low-speed driven gear 54 on one side of the meshed pair of the transmission driving gears 43 and 44 and the transmission driven gears 53 and 54, the damper springs 57a, 57b, 58a, and 58b are disposed between the high-speed driven gear 53 as well as the low-speed driven gear and the first and second intermediate rotational members 55 and 56 (see FIGS. 6 and 7). In addition, the cam-type torque damper 60 is disposed between the transmission driven gear 51 and the first and second intermediate rotational members 55 and 56 on the downstream side with respect to power transmission. This configuration ensures that the cam-type torque damper 60 and the damper springs 57a, 57b, 58a, and 58b on the upstream side cooperate with each other in exhibiting a vibration-isolating effect on excessive reverse torques exerted from the front wheels 2, 2 and the rear wheels 3, 3. Consequently, the damper springs 57a, 57b, 58a, and 58b can be reduced in size.

The damper springs 57a, 57b, 58a, and 58b interposed between the high-speed driven gear 53 as well as the low-speed driven gear 54 and the first and second intermediate rotational members 55 and 56 are dispersely arranged in plurality along the circumferential direction. Therefore, it is possible to reduce the size of each of the damper springs 57a, 57b, 58a, and 58b, to arrange the damper springs compactly in the circumferential direction, and to reduce the size of the vibration-isolating structure, while maintaining required spring elastic forces.

The damper springs 57a, 57b, 58a, 58b are the damper springs 57a and 58a and the damper springs 57b and 58b which are different in spring characteristics, the different damper springs being mixedly present. Therefore, it is possible to absorb torsional vibrations in a wide vibrational frequency range, and to enhance vibration isolation characteristics.

The damper springs 57a, 57b, 58a, and 58b are disposed at the spoke parts 53b and 54b of the high-speed driven gear 53 as well as the low-speed driven gear 54 in the surroundings of the power transmission shaft 51, and are interposed between the high-speed driven gear 53 as well as the low-speed driven gear 54 and the first and second intermediate rotational members 55 and 56. Therefore, the damper springs 57a, 57b, 58a, and 58b are arranged while utilizing the spaces near the spoke parts 53b and 54b between the tooth portions of the high-speed driven gear 53 as well as the low-speed driven gear 54 and the transmission driven shaft 51. Accordingly, it is possible to mount the vibration-isolating structure in position in a compact form, to thereby reduce the size of the sub transmission Ts, and to reduce the number of component parts.

The high-speed driven gear 53 and the low-speed driven gear 54 relevant respectively to different gear speeds are arranged, with the damper springs 57a and 57b and the damper springs 58a and 58b interposed between themselves and the first and second intermediate rotational members 55 and 56, respectively. Therefore, the high-speed driven gear 53 and the low-speed driven gear 54 relevant to different speeds can be disposed in compact form through common use of the first and second intermediate rotational members 55 and 56 as well as the cam-type torque damper 60. Accordingly, appropriate vibration isolation characteristics can be easily set for each of different gear speeds, while adopting a simple structure having a reduced number of component parts.

The power unit P in this embodiment has the twin clutch 30 between the internal combustion engine E and the main transmission Tm, and has the clutch damper spring 29s on the input side of the twin clutch 30. By the clutch damper spring 29s, the influences of variations in the torque of the crankshaft 21 of the internal combustion engine E can be prevented from being imposed on the transmission Tm side. In addition, torque variations attendant on a shift of the twin clutch 30 can also be absorbed. In this way, vibrations of the power unit P can be reduced.

The power unit P includes the main transmission Tm on the upstream side with respect to power transmission and the sub transmission Ts on the downstream side. In this case, the counter shaft 32 as the main transmission output shaft of the main transmission Tm, and the transmission driving shaft 41 as the sub transmission input shaft of the sub transmission Ts are in spline fit to each other and are rotated as one body. In addition, the cam-type torque damper 60 as well as the damper springs 57a, 57b, 58a, 58b are interposed between the transmission driven shaft (output shaft) 51 and the high-speed driven gear 53 as well as the low-speed driven gear 54, on the further downstream side of the sub transmission Ts (which is on the downstream side as above-mentioned). Thus, the clutch damper spring 29s is arranged for the twin clutch 30 on the input side of the main transmission Ts located on the upstream side. The cam-type torque damper 60 and the damper springs 57a, 57b, 58a, and 58b are arranged on the output side of the sub transmission Ts located on the downstream side. The power transmission between the main transmission Tm and the sub transmission Ts is based on a process in which the counter shaft 32 of the main transmission Tm and the transmission driving shaft 41 of the sub transmission Ts are rotated as one body owing to the spline fit thereof. Therefore, variations in torque of the twin clutch 30 and the main transmission Tm on the upstream side of the spline fit part 39 and the variations in torque of the sub transmission Ts cancel each other owing to the spline fit between the counter shaft 32 and the transmission driving shaft 41. Consequently, an excellent vibration-isolating effect is produced.

DESCRIPTION OF REFERENCE SYMBOLS

P . . . Power unit, E . . . Internal combustion engine, Tm . . . Main transmission, Ts . . . Sub transmission, 1 . . . All-terrain vehicle, 28 . . . Primary driving gear, 29 . . . Primary driven gear, 29s . . . Clutch damper spring, 30 . . . Twin clutch, 31 . . . Main shaft, 32 . . . Counter shaft, 41 . . . Transmission driving shaft, 43 . . . High-speed driving gear, 44 . . . Low-speed driving gear, 45 . . . Reverse driving gear, 51 . . . Transmission driven shaft (output shaft), 53 . . . High-speed driven gear, 54 . . . Low-speed driven gear, 55 . . . First intermediate rotational member, 56 . . . Second intermediate rotational member, 57a and 57b . . . Damper spring, 58a and 58b . . . Damper spring, 60 . . . Cam-type torque damper, 61 . . . Male cam member, 62 . . . Spring receiving member, 64 . . . Coil spring.

We claim:

1. A power unit comprising:
an internal combustion engine;
a transmission configured to transmit rotational driving force of the internal combustion engine; and
a vibration isolating structure,
wherein the vibration isolating structure comprises torque dampers, and
wherein the torque dampers are configured to be disposed between a transmission gear of the transmission and a power transmission shaft supporting the transmission gear,
wherein the power unit further comprises mutually rotatable intermediate rotational members,
wherein the transmission gear comprises a forwardly opening recess, and the intermediate rotational members comprise a rearwardly opening arcuate recess,
wherein the forwardly opening recess faces respectively to the rearwardly opening arcuate recess,
wherein the torque dampers are interposed in a bridging manner within and between both the mutually facing forwardly opening recess and the rearwardly opening arcuate recess,
wherein the mutually rotatable intermediate rotational members are configured to be interposed between the transmission gear and the power transmission shaft supporting the transmission gear, and
wherein the vibration isolating structure further comprises a cam torque dampener disposed between the power transmission shaft and one of the intermediate rotational members.

2. The power unit according to claim 1, further comprising:
a clutch device configured to be disposed between the internal combustion engine and the transmission; and
a clutch damper configured to be disposed on an input side of the clutch device.

3. A power unit comprising:
an internal combustion engine;
a transmission configured to transmit rotational driving force of the internal combustion engine; and
a vibration isolating structure,
wherein the vibration isolating structure comprises torque dampers, and
wherein the torque dampers are configured to be disposed between a transmission gear of the transmission and a power transmission shaft supporting the transmission gear,
wherein the power unit further comprises mutually rotatable intermediate rotational members,
wherein the transmission gear comprises a forwardly opening recess, and the intermediate rotational members comprise a rearwardly opening arcuate recess,
wherein the forwardly opening recess faces respectively to the rearwardly opening arcuate recess, and
wherein the torque dampers are interposed in a bridging manner within and between both the mutually facing forwardly opening recess and the rearwardly opening arcuate recess,
wherein the mutually rotatable intermediate rotational members are configured to be interposed between the transmission gear and the power transmission shaft supporting the transmission gear,
wherein the intermediate rotational members are configured to be supported on the power transmission shaft,
wherein the torque dampers comprise a cam torque damper configured to be disposed between the power transmission shaft and the intermediate rotational members, and
wherein the torque dampers further comprise damper springs configured to be disposed between the intermediate rotational members and the transmission gear.

4. The power unit according to claim 3,
wherein the transmission gear is a transmission driven gear of a pair of a transmission driving gear and the transmission driven gear meshed with each other.

5. The power unit according to claim 3,
wherein the damper springs are configured to be arranged in plurality along a circumferential direction.

6. The power unit according to claim 3,
wherein the damper springs are configured to be disposed at a spoke part of the transmission gear in the surroundings of the power transmission shaft, and
wherein the damper springs are configured to be interposed between the transmission gear and the intermediate rotational members.

7. The power unit according to claim 3, further comprising:
a second transmission gear,
wherein a second damper spring is interposed between the second transmission gear and the intermediate rotational members.

8. A power unit comprising:
an internal combustion engine;
a transmission configured to transmit rotational driving force of the internal combustion engine;
a vibration isolating structure,
wherein the vibration isolating structure comprises torque dampers,
wherein the torque dampers are configured to be disposed between a transmission gear of the transmission and a power transmission shaft supporting the transmission gear,
wherein the power unit further comprises mutually rotatable intermediate rotational members configured to be interposed between the transmission gear and the power transmission shaft supporting the transmission gear, the intermediate rotational members configured to be supported on the power transmission shaft, wherein the torque dampers comprise a cam torque damper configured to be disposed between the power transmission shaft and the intermediate rotational members, wherein the torque dampers further comprise damper springs configured to be disposed between the intermediate rotational members and the transmission gear, wherein the damper springs are configured to be disposed between the transmission gear and the intermediate rotational members, wherein the damper springs are configured to be arranged in plurality along a circumferential direction, and wherein the damper springs comprise damper springs different in spring characteristics, the different damper springs being mixedly present.

9. A power unit comprising:
an internal combustion engine;
a transmission configured to transmit rotational driving force of the internal combustion engine; and
a vibration isolating structure,
wherein the vibration isolating structure comprises torque dampers, and
wherein the torque dampers are configured to be disposed between a transmission gear of the transmission and a power transmission shaft supporting the transmission gear,
wherein the power unit further comprises mutually rotatable intermediate rotational members,
wherein the transmission gear comprises a forwardly opening recess, and the intermediate rotational members comprise a rearwardly opening arcuate recess,
wherein the forwardly opening recess faces respectively to the rearwardly opening arcuate recess,
wherein the torque dampers are interposed in a bridging manner within and between both the mutually facing forwardly opening recess and the rearwardly opening arcuate recess,
wherein the power unit further comprises a clutch device configured to be disposed between the internal combustion engine and the transmission, a clutch damper configured to be disposed on an input side of the clutch device, a main transmission output shaft of a main transmission, and a sub transmission input shaft of a sub transmission,
wherein the main transmission output shaft and the sub transmission input shaft are in spline fit to each other,
wherein the transmission further comprises the main transmission on an upstream side with respect to power transmission,
wherein the transmission further comprises the sub transmission on a downstream side with respect to the power transmission, and
wherein the transmission gear is configured to be disposed with the torque dampers, and is the transmission gear of the sub transmission.

10. A power unit comprising:
an internal combustion engine means for generating motive power;
a transmission means for transmitting rotational driving force of the internal combustion engine means; and
a vibration isolating means for suppressing torque variations,
wherein the vibration isolating means comprises torque damper means for damping torque variations, and
wherein the torque damper means are configured to be disposed between a transmission gear of the transmission means and a power transmission shaft supporting the transmission gear,
wherein the power unit further comprises mutually rotatable intermediate rotational members,
wherein the transmission gear comprises a forwardly opening recess, and the intermediate rotational members comprise a rearwardly opening arcuate recess,
wherein the forwardly opening recess faces respectively to the rearwardly opening arcuate recess,
wherein the torque damper means are interposed in a bridging manner within and between both the mutually facing forwardly opening recess and the rearwardly opening arcuate recess,
wherein the mutually rotatable intermediate rotational members are configured to be interposed between the transmission gear and the power transmission shaft supporting the transmission gear, and
wherein the vibration isolating means further comprises a cam torque dampener disposed between the power transmission shaft and one of the intermediate rotational members.

11. The power unit according to claim 10, further comprising:
a clutch device means for engaging the internal combustion engine; and
a clutch damper means for reducing vibration of the power unit,
wherein the clutch device means is configured to be disposed between the internal combustion engine and the transmission, and
wherein the clutch damper means is configured to be disposed on an input side of the clutch device.

12. A power unit comprising:
an internal combustion engine means for generating motive power;
a transmission means for transmitting rotational driving force of the internal combustion engine means; and
a vibration isolating means for suppressing torque variations,
wherein the vibration isolating means comprises torque damper means for damping torque variations, and
wherein the torque damper means are configured to be disposed between a transmission gear of the transmission means and a power transmission shaft supporting the transmission gear,
wherein the power unit further comprises mutually rotatable intermediate rotational members,
wherein the transmission gear comprises a forwardly opening recess, and the intermediate rotational members comprise a rearwardly opening arcuate recess,
wherein the forwardly opening recess faces respectively to the rearwardly opening arcuate recess, and
wherein the torque damper means are interposed in a bridging manner within and between both the mutually facing forwardly opening recess and the rearwardly opening arcuate recess,
wherein the mutually rotatable intermediate rotational members are configured to be interposed between the transmission gear and the power transmission shaft supporting the transmission gear,
wherein the intermediate rotational members are configured to be supported on the power transmission shaft, wherein the torque damper means comprise a cam torque damper configured to be disposed between the power transmission shaft and the intermediate rotational members, and
wherein the torque damper means further comprise damper springs configured to be disposed between the intermediate rotational members and the transmission gear.

13. The power unit according to claim 12,
wherein the transmission gear is a transmission driven gear of a pair of a transmission driving gear and the transmission driven gear meshed with each other.

14. The power unit according to claim 12,
wherein the damper springs are configured to be arranged in plurality along a circumferential direction.

15. The power unit according to claim 12,
wherein the damper springs are configured to be disposed at a spoke part of the transmission gear in the surroundings of the power transmission shaft, and
wherein the damper springs are configured to be interposed between the transmission gear and the intermediate rotational members.

16. The power unit according to claim 12, further comprising:
a second transmission gear,
wherein a second damper spring is interposed between the second transmission gear and the intermediate rotational members.

17. A power unit comprising:
an internal combustion engine means for generating motive power;
a transmission means for transmitting rotational driving force of the internal combustion engine means; and
a vibration isolating means for suppressing torque variations,
wherein the vibration isolating means comprises torque damper means for damping torque variations,
wherein the torque damper means are configured to be disposed between a transmission gear of the transmission means and a power transmission shaft supporting the transmission gear,
wherein the power unit further comprises mutually rotatable intermediate rotational members configured to be interposed between the transmission gear and the power transmission shaft supporting the transmission gear, the intermediate rotational members configured to be supported on the power transmission shaft,
wherein the torque damper means comprise a cam torque damper configured to be disposed between the power transmission shaft and the intermediate rotational members,
wherein the torque damper means further comprise damper springs configured to be disposed between the intermediate rotational members and the transmission gear,
wherein the damper springs are configured to be disposed between the transmission gear and the intermediate rotational members, wherein the damper springs are configured to be arranged in plurality along a circumferential direction, and
wherein the damper springs comprise damper springs different in spring characteristics, the different damper springs being mixedly present.

18. A power unit comprising:
an internal combustion engine means for generating motive power;
a transmission means for transmitting rotational driving force of the internal combustion engine means; and
a vibration isolating means for suppressing torque variations,
wherein the vibration isolating means comprises torque damper means for damping torque variations, and
wherein the torque damper means are configured to be disposed between a transmission gear of the transmission means and a power transmission shaft supporting the transmission gear,
wherein the power unit further comprises mutually rotatable intermediate rotational members,
wherein the transmission gear comprises a forwardly opening recess, and the intermediate rotational members comprise a rearwardly opening arcuate recess,
wherein the forwardly opening recess faces respectively to the rearwardly opening arcuate recess,
wherein the torque damper means are interposed in a bridging manner within and between both the mutually facing forwardly opening recess and the rearwardly opening arcuate recess,
wherein the power unit further comprises a clutch device means for engaging the internal combustion engine, a clutch damper means for reducing vibration of the power unit, a main transmission output shaft means of a main transmission for reducing variations in torque of the clutch device means and transmission means, and a sub transmission input shaft of a sub transmission for reducing variations in torque of the clutch device means and transmission means,
wherein the clutch device means is configured to be disposed between the internal combustion engine and the transmission,
wherein the clutch damper means is configured to be disposed on an input side of the clutch device,
wherein the main transmission output shaft means and the sub transmission input shaft means are in spline fit to each other,
wherein the transmission means further comprises the main transmission on an upstream side with respect to power transmission,
wherein the transmission means further comprises the sub transmission on a downstream side with respect to the power transmission, and
wherein the transmission gear is configured to be disposed with the torque dampers, and is the transmission gear of the sub transmission.

* * * * *